(12) United States Patent
Lee et al.

(10) Patent No.: US 10,235,008 B2
(45) Date of Patent: Mar. 19, 2019

(54) ON-LINE INTERACTION SYSTEM

(71) Applicant: SOCIAL CONCEPTS, INC., A DELAWARE CORPORATION, Redwood City, CA (US)

(72) Inventors: Joseph William Lee, Los Angeles, CA (US); Peter August Grendler, San Francisco, CA (US); Michael R. Hedlund, Los Gatos, CA (US)

(73) Assignee: SOCIAL CONCEPTS, INC., Los Altos, CA (US)

( * ) Notice: Subject to any disclaimer, the term of this patent is extended or adjusted under 35 U.S.C. 154(b) by 1174 days.

(21) Appl. No.: 14/515,787

(22) Filed: Oct. 16, 2014

(65) Prior Publication Data

US 2015/0067500 A1 Mar. 5, 2015

Related U.S. Application Data

(60) Division of application No. 11/845,664, filed on Aug. 27, 2007, now abandoned, which is a
(Continued)

(51) Int. Cl.
*G06F 15/16* (2006.01)
*G06F 3/0481* (2013.01)
(Continued)

(52) U.S. Cl.
CPC ...... *G06F 3/04812* (2013.01); *G06F 3/04842* (2013.01); *G06F 9/453* (2018.02);
(Continued)

(58) Field of Classification Search
CPC .. G06Q 50/01; G06Q 10/101; G06Q 30/0201; G06Q 30/0226; G06Q 30/0255;
(Continued)

(56) References Cited

U.S. PATENT DOCUMENTS 5,680,455 A 10/1997 Linsker
5,774,870 A 6/1998 Storey
(Continued)

FOREIGN PATENT DOCUMENTS

WO 2008/086119 A2 7/2008
WO 2008/092066 A2 7/2008
(Continued)

OTHER PUBLICATIONS

David Mazieres and M. Frans Kaashoek, The Design, Implementation and Operation of an Email Pseudonym Server; Jul. 31, 1998; Laboratory for computer Science; pp. 1-19.
(Continued)

*Primary Examiner* — Jungwon Chang
(74) *Attorney, Agent, or Firm* — Schwabe Williamson & Wyatt, PC

(57) ABSTRACT

An avatar display system monitors the activities or status of different members on a network site. Avatars representing the different members are displayed in conjunction with an on-line application according to the different identified member activities or status. Different avatar display techniques and filtering schemes are used to both promote and improve interactions between different members of the on-line application or website.

20 Claims, 18 Drawing Sheets

Related U.S. Application Data continuation-in-part of application No. 11/627,326, filed on Jan. 25, 2007, now Pat. No. 8,180,852, which is a continuation-in-part of application No. 11/619,520, filed on Jan. 3, 2007, now Pat. No. 8,413,059.

(51) Int. Cl.

| | |
|---|---|
| *G06Q 10/10* | (2012.01) |
| *H04L 29/08* | (2006.01) |
| *G06F 3/0484* | (2013.01) |
| *H04L 12/58* | (2006.01) |
| *G06F 9/451* | (2018.01) |
| *G06Q 50/00* | (2012.01) |
| *G06F 17/30* | (2006.01) |
| *H04L 29/06* | (2006.01) |

(52) U.S. Cl.
CPC .............. *G06Q 10/10* (2013.01); *H04L 51/00* (2013.01); *H04L 67/24* (2013.01); *G06F 3/0481* (2013.01); *G06F 17/30867* (2013.01); *G06Q 50/01* (2013.01); *H04L 51/12* (2013.01); *H04L 51/32* (2013.01); *H04L 63/102* (2013.01); *H04L 65/403* (2013.01); *H04L 67/22* (2013.01)

(58) Field of Classification Search
CPC .... G06Q 30/0256; G06Q 30/08; G06Q 30/02; G06Q 10/06; G06Q 10/109; G06Q 10/10; G06Q 10/107; H04L 67/306; H04L 67/22; H04L 65/403; H04L 51/04; H04L 51/32; H04L 67/24; H04L 51/00; H04L 51/12; H04L 63/102; G06F 17/30867; G06F 3/0482; G06F 17/30601; G06F 3/04812; G06F 3/0481; G06F 3/04842; G06F 9/453; H04M 1/72544
USPC .............. 709/217, 219, 220; 455/414.1, 466; 715/706
See application file for complete search history.

(56) References Cited

U.S. PATENT DOCUMENTS

| | | | |
|---|---|---|---|
| 5,826,244 A | 10/1998 | Huberman |
| 5,831,590 A | 11/1998 | Ikedo |
| 6,064,978 A | 5/2000 | Gardner |
| 6,252,588 B1 | 6/2001 | Dawson |
| 6,263,381 B1 | 7/2001 | Freadman |
| 6,515,681 B1 | 2/2003 | Knight |
| 6,571,279 B1 | 5/2003 | Herz |
| 6,661,438 B1 | 12/2003 | Shiraishi |
| 6,779,178 B1 | 8/2004 | Lloyd |
| 6,793,128 B2 | 9/2004 | Huffman |
| 6,898,631 B1 | 5/2005 | Kraft |
| 6,901,151 B1 | 5/2005 | Rosenbaum |
| 6,983,309 B1 | 1/2006 | Yoshizawa |
| 6,985,248 B2 | 1/2006 | Parulski |
| 7,020,650 B2 | 3/2006 | Sato |
| 7,023,979 B1 | 4/2006 | Wu |
| 7,034,871 B2 | 4/2006 | Parulski |
| 7,037,195 B2 | 5/2006 | Schneider |
| 7,111,317 B1 | 9/2006 | McIntyre |
| 7,117,370 B2 | 10/2006 | Khan |
| 7,158,945 B1 | 1/2007 | Wolcott |
| 7,174,312 B2 | 2/2007 | Harper |
| 7,177,044 B2 | 2/2007 | Tachiyama |
| 7,194,253 B2 | 3/2007 | Ritter |
| 7,240,022 B1 | 7/2007 | Bistriceanu |
| 7,289,110 B2 | 10/2007 | Hansson |
| 7,308,277 B2 | 12/2007 | Yomoda |
| 7,312,827 B2 | 12/2007 | Cazier |
| 7,464,137 B2 | 12/2008 | Zhu |
| 7,523,385 B2 | 4/2009 | Nguyen |
| 7,530,021 B2 | 5/2009 | Cheng |
| 7,627,311 B2 | 12/2009 | Öijer |
| 7,653,648 B2 | 1/2010 | Pacholec |
| 7,660,854 B2 | 2/2010 | Sorotzkin |
| 7,740,538 B2 | 6/2010 | Nguyen |
| 7,788,387 B2 | 8/2010 | Kumar |
| 7,797,529 B2 | 9/2010 | Jiang |
| 7,813,822 B1 | 10/2010 | Hoffberg |
| 7,822,631 B1 | 10/2010 | Vander Mey |
| 7,827,208 B2 | 11/2010 | Bosworth |
| 7,920,626 B2 | 4/2011 | Fernandez |
| 7,945,653 B2 | 5/2011 | Zuckerberg |
| 8,014,763 B2 | 9/2011 | Hymes |
| 8,020,965 B2 | 9/2011 | Brown et al. |
| 8,022,926 B2 | 9/2011 | Arai |
| 8,127,009 B2 | 2/2012 | Pinder |
| 8,135,800 B1 | 3/2012 | Walsh |
| 8,166,407 B2 | 4/2012 | Lee |
| 8,180,852 B2 | 5/2012 | Lee |
| 8,190,681 B2 | 5/2012 | Markus |
| 8,200,808 B2 | 6/2012 | Ishida |
| 8,413,059 B2 | 4/2013 | Lee |
| 8,549,076 B2 | 10/2013 | Mizrahi |
| 8,600,830 B2 | 12/2013 | Hoffberg |
| 8,601,062 B2 | 12/2013 | Buchheit |
| 8,626,828 B2 | 1/2014 | Lee |
| 8,738,719 B2 | 5/2014 | Lee |
| 2001/0019359 A1 | 9/2001 | Parulski |
| 2001/0028467 A1 | 10/2001 | Ishihara |
| 2002/0049632 A1 | 4/2002 | Parkinson |
| 2002/0070945 A1 | 6/2002 | Kage |
| 2002/0116266 A1 | 8/2002 | Marshall |
| 2002/0116508 A1 | 8/2002 | Khan |
| 2002/0133637 A1 | 9/2002 | Popp |
| 2002/0191223 A1 | 12/2002 | Ishikawa |
| 2003/0005058 A1 | 1/2003 | Sorotzkin |
| 2003/0063913 A1 | 4/2003 | Yamazaki |
| 2003/0100360 A1 | 5/2003 | Manfredi |
| 2003/0105820 A1 | 6/2003 | Haims |
| 2003/0125080 A1 | 7/2003 | Shimamura |
| 2003/0125107 A1 | 7/2003 | Cannon |
| 2003/0227479 A1 | 12/2003 | Mizrahi |
| 2003/0231207 A1 | 12/2003 | Huang |
| 2004/0088325 A1 | 5/2004 | Elder |
| 2004/0093281 A1 | 5/2004 | Silverstein |
| 2004/0122803 A1 | 6/2004 | Dom |
| 2004/0133480 A1 | 7/2004 | Domes |
| 2004/0137882 A1 | 7/2004 | Forsyth |
| 2004/0221224 A1 | 11/2004 | Blattner |
| 2004/0224703 A1 | 11/2004 | Takaki |
| 2004/0233471 A1 | 11/2004 | Inoue |
| 2004/0243424 A1 | 12/2004 | Jeong |
| 2004/0254928 A1 | 12/2004 | Vronay |
| 2004/0259630 A1 | 12/2004 | Huard |
| 2005/0043992 A1 | 2/2005 | Cohagan |
| 2005/0055272 A1 | 3/2005 | Ryan |
| 2005/0075889 A1 | 4/2005 | Gomes |
| 2005/0078804 A1 | 4/2005 | Yomoda |
| 2005/0080845 A1 | 4/2005 | Gopinath |
| 2005/0081142 A1 | 4/2005 | Popp |
| 2005/0086211 A1 | 4/2005 | Mayer |
| 2005/0097024 A1 | 5/2005 | Rainey |
| 2005/0102381 A1 | 5/2005 | Jiang |
| 2005/0125505 A1 | 6/2005 | Kim |
| 2005/0154639 A1 | 7/2005 | Zetmeir |
| 2005/0159970 A1 | 7/2005 | Buyukkokten |
| 2005/0193054 A1 | 9/2005 | Wilson |
| 2005/0222985 A1 | 10/2005 | Buchheit |
| 2005/0262203 A1 | 11/2005 | Buchheit |
| 2005/0273344 A1 | 12/2005 | Lee |
| 2005/0273377 A1 | 12/2005 | Ouimet |
| 2006/0004619 A1 | 1/2006 | Matheson |
| 2006/0004703 A1 | 1/2006 | Spivack |
| 2006/0007372 A1 | 1/2006 | Yuuki |
| 2006/0042483 A1 | 3/2006 | Work |
| 2006/0044609 A1 | 3/2006 | Kato |
| 2006/0047766 A1 | 3/2006 | Spadea, III |
| 2006/0053194 A1 | 3/2006 | Schneider |

(56) References Cited

U.S. PATENT DOCUMENTS

| | | |
|---|---|---|
| 2006/0075044 A1 | 4/2006 | Fox |
| 2006/0080613 A1 | 4/2006 | Savant |
| 2006/0089147 A1 | 4/2006 | Beaty |
| 2006/0098992 A1 | 5/2006 | Yamazaki |
| 2006/0117264 A1 | 6/2006 | Beaton |
| 2006/0136498 A1 | 6/2006 | Insley |
| 2006/0156329 A1 | 7/2006 | Treese |
| 2006/0168056 A1 | 7/2006 | Gandhi |
| 2006/0170705 A1 | 8/2006 | Wilson |
| 2006/0190281 A1 | 8/2006 | Kott |
| 2006/0200523 A1 | 9/2006 | Tokuda |
| 2006/0224938 A1 | 10/2006 | Fikes |
| 2006/0237532 A1 | 10/2006 | Scott-Leikach |
| 2006/0242139 A1 | 10/2006 | Butterfield |
| 2006/0245555 A1 | 11/2006 | Makela |
| 2006/0252547 A1 | 11/2006 | Mizrahi |
| 2006/0253491 A1 | 11/2006 | Gokturk |
| 2006/0256959 A1 | 11/2006 | Hymes |
| 2006/0259910 A1 | 11/2006 | Popp |
| 2006/0265596 A1 | 11/2006 | Nagayama |
| 2006/0269309 A1 | 11/2006 | Yamazaki |
| 2006/0282317 A1 | 12/2006 | Rosenberg |
| 2006/0282426 A1 | 12/2006 | Spears |
| 2007/0005754 A1 | 1/2007 | Horvitz |
| 2007/0011186 A1 | 1/2007 | Horner |
| 2007/0011236 A1 | 1/2007 | Ravula |
| 2007/0011340 A1 | 1/2007 | Seidl |
| 2007/0022190 A1 | 1/2007 | Brasegard |
| 2007/0027931 A1 | 2/2007 | Heckenbach |
| 2007/0033280 A1 | 2/2007 | Popp |
| 2007/0067271 A1 | 3/2007 | Lu |
| 2007/0067392 A1 | 3/2007 | Torres |
| 2007/0100939 A1 | 5/2007 | Bagley |
| 2007/0107007 A1 | 5/2007 | Wolcott |
| 2007/0113241 A1 | 5/2007 | Mai |
| 2007/0118461 A1 | 5/2007 | Arkes |
| 2007/0121843 A1 | 5/2007 | Atazky |
| 2007/0135097 A1 | 6/2007 | Rahkonen |
| 2007/0136428 A1 | 6/2007 | Boutboul |
| 2007/0143185 A1 | 6/2007 | Harmon |
| 2007/0157273 A1 | 7/2007 | McIntyre |
| 2007/0161382 A1 | 7/2007 | Melinger |
| 2007/0162569 A1 | 7/2007 | Robinson |
| 2007/0179792 A1 | 8/2007 | Kramer |
| 2007/0180039 A1 | 8/2007 | Sutidze |
| 2007/0184855 A1 | 8/2007 | Klassen |
| 2007/0209067 A1 | 9/2007 | Fogel |
| 2007/0219863 A1 | 9/2007 | Park |
| 2007/0219958 A1 | 9/2007 | Park |
| 2007/0220092 A1 | 9/2007 | Heitzeberg |
| 2007/0220128 A1 | 9/2007 | Yang |
| 2007/0233787 A1 | 10/2007 | Pagan |
| 2007/0240119 A1 | 10/2007 | Ducheneaut |
| 2007/0244749 A1 | 10/2007 | Speiser |
| 2007/0250901 A1 | 10/2007 | McIntire |
| 2007/0259654 A1 | 11/2007 | Oijer |
| 2007/0264966 A1 | 11/2007 | Arai |
| 2007/0296739 A1 | 12/2007 | Lonn |
| 2008/0005249 A1 | 1/2008 | Hart |
| 2008/0010139 A1 | 1/2008 | Elmer |
| 2008/0030496 A1 | 2/2008 | Lee |
| 2008/0033739 A1 | 2/2008 | Zuckerberg |
| 2008/0033941 A1 | 2/2008 | Parrish |
| 2008/0040370 A1 | 2/2008 | Bosworth |
| 2008/0049107 A1 | 2/2008 | Hii |
| 2008/0064374 A1 | 3/2008 | Coffing |
| 2008/0072157 A1 | 3/2008 | Pally |
| 2008/0077595 A1 | 3/2008 | Leebow |
| 2008/0086703 A1 | 4/2008 | Flynt |
| 2008/0091517 A1 | 4/2008 | Koonce |
| 2008/0091723 A1 | 4/2008 | Zuckerberg |
| 2008/0091771 A1 | 4/2008 | Allen |
| 2008/0114737 A1 | 5/2008 | Neely |
| 2008/0115149 A1 | 5/2008 | Rupp |
| 2008/0133716 A1 | 6/2008 | Rao |
| 2008/0153595 A1 | 6/2008 | Chickering |
| 2008/0162649 A1 | 7/2008 | Lee |
| 2008/0168497 A1 | 7/2008 | Mitchem |
| 2008/0183750 A1 | 7/2008 | Lee |
| 2008/0184133 A1 | 7/2008 | Lee |
| 2008/0195664 A1 | 8/2008 | Maharajh |
| 2008/0250332 A1 | 10/2008 | Farrell |
| 2009/0018903 A1 | 1/2009 | Iyler |
| 2009/0019370 A1 | 1/2009 | Pally |
| 2009/0117883 A1 | 5/2009 | Coffing |
| 2009/0119603 A1 | 5/2009 | Stackpole |
| 2009/0186699 A9 | 7/2009 | Kelly |
| 2009/0285506 A1 | 11/2009 | Benson |
| 2009/0315991 A1 | 12/2009 | Renkis |
| 2010/0016003 A1 | 1/2010 | Shapiro |
| 2010/0031341 A1 | 2/2010 | Loh |
| 2010/0050090 A1 | 2/2010 | Leebow |
| 2010/0100943 A1 | 4/2010 | Pacholec |
| 2010/0103277 A1 | 4/2010 | Leebow |
| 2010/0223341 A1 | 9/2010 | Manolescu |
| 2010/0235285 A1 | 9/2010 | Hoffberg |
| 2010/0268783 A1 | 10/2010 | Mizosoe |
| 2011/0035680 A1 | 2/2011 | Borovoy |
| 2012/0185538 A1 | 7/2012 | Lee |
| 2013/0179520 A1 | 7/2013 | Lee |
| 2014/0082084 A1 | 3/2014 | Lee |

FOREIGN PATENT DOCUMENTS

| | | |
|---|---|---|
| WO | 2008/092071 A2 | 7/2008 |
| WO | 2009/029680 A2 | 3/2009 |

OTHER PUBLICATIONS

"HTML Marquee Code." Free Webmaster Tutorials—Quackit.com. Nov. 2005.
SoftComplex Inc., "Tigra Scroller PRO—Demo #1 (Vertical automatic scrolling)"; Dec. 31, 2005.
"JavaScript Scroller Pro—Demo #1 (Vertical Automatic Scroller)"; JavaScript Scroller Pro—Demo #1 (Vertical Automatic Scrolling); Dec. 31, 2005; Web Jan. 9, 2012.
International Search Report for PCT/US08/50146 dated May 20, 2008; 3 pages.
Lu; "Interaction Design Principles for Interactive Television"; Master's thesis, submitted to Georgia Institute of Technology, Dept. of Information Design and Technology (online), Published May 2005, (retrieved on Jul. 3, 2008).
International Search Report for PCT/US08/52021 dated Jul. 14, 2008, 2 pages.
International Search Report for PCT/US2008/052029 dated Jul. 16, 2008, 2 pgs.
International Search Report for PCT/US08/74512 dated Jul. 6, 2009; 3 pages.
SoftComplex Inc., "Tigra Scroller PRO—Demo #1 (Vertical automatic scrolling)", Jan. 2, 2012; 1 page.
Stolowitz Ford Cowger LLP; Updated Listing of Related Cases; Jan. 26, 2015; 1 page.

```
                          40
    ┌─────────────────────────────────────────┐
    │  CHECK USER PROFILE FOR AVATAR PREFERENCES │
    └─────────────────────────────────────────┘
                          │
                          ▼       42
    ┌─────────────────────────────────────────┐
    │ CHECK PROFILES AND LOG FILES ACCORDING TO USER AVATAR │
    │                PREFERENCES              │
    └─────────────────────────────────────────┘
                          │
                          ▼       44
    ┌─────────────────────────────────────────┐
    │ DISPLAY MEMBER AVATARS CORRESPONDING WITH USER │
    │            AVATAR PREFERENCES           │
    └─────────────────────────────────────────┘
                          │
                          ▼       46
    ┌─────────────────────────────────────────┐
    │          MONITOR USER LOG FILES         │
    └─────────────────────────────────────────┘
                          │
                          ▼       48
    ┌─────────────────────────────────────────┐
    │ IF APPLICABLE, DISPLAY MEMBER AVATARS ACCORDING TO │
    │               USER LOG FILE             │
    └─────────────────────────────────────────┘
```

FIG. 2

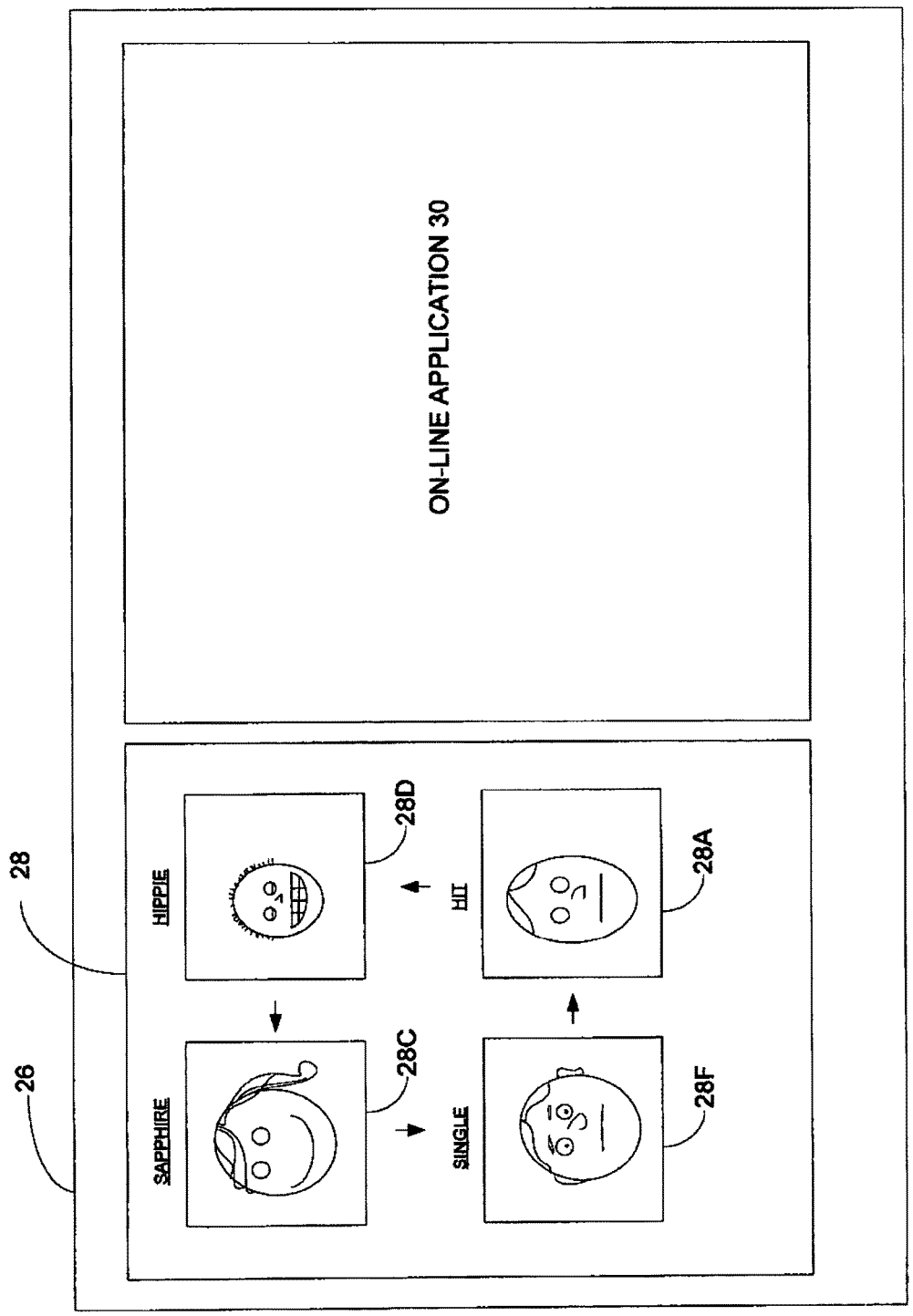

```
                                                                91
┌─────────────────────────────────────────────────────────────────┐
│  SCAN USSER PROFILE, CONTACT LIST, EMAIL DIRECTOR, AND LOG      │
│  FILES FOR AVATAR OUTGOING FILTER PARAMETERS                    │
└─────────────────────────────────────────────────────────────────┘
                                │
                                ▼                               93
┌─────────────────────────────────────────────────────────────────┐
│  CALCULATE OUTGOING AVATAR FILTERS ACCORDING TO                 │
│  IDENTIFIED OUTGOING FILTER PARAMETERS                          │
└─────────────────────────────────────────────────────────────────┘
                                │
                                ▼                               95
┌─────────────────────────────────────────────────────────────────┐
│  FILTER OUTGOING USER AVATARS ACCORDING TO CALCULATED           │
│  OUTGOING AVATAR FILTERS                                        │
└─────────────────────────────────────────────────────────────────┘
                                │
                                ▼                               97
┌─────────────────────────────────────────────────────────────────┐
│  SCAN USER PROFILE, CONTACT LIST, EMAIL DIRECTORY, AND LOG      │
│  FILES FOR AVATAR INCOMING FILTER PARAMETERS                    │
└─────────────────────────────────────────────────────────────────┘
                                │
                                ▼                               99
┌─────────────────────────────────────────────────────────────────┐
│  CALCULATE INCOMING AVATARS FILTERS ACCORDING TO                │
│  IDENTIFIED INCOMING FILTER PARAMETERS                          │
└─────────────────────────────────────────────────────────────────┘
                                │
                                ▼                              101
┌─────────────────────────────────────────────────────────────────┐
│  FILTER INCOMING USER AVATARS ACCORDING TO CALCULATED           │
│  INCOMING AVATAR FILTERS                                        │
└─────────────────────────────────────────────────────────────────┘
```

FIG. 9B

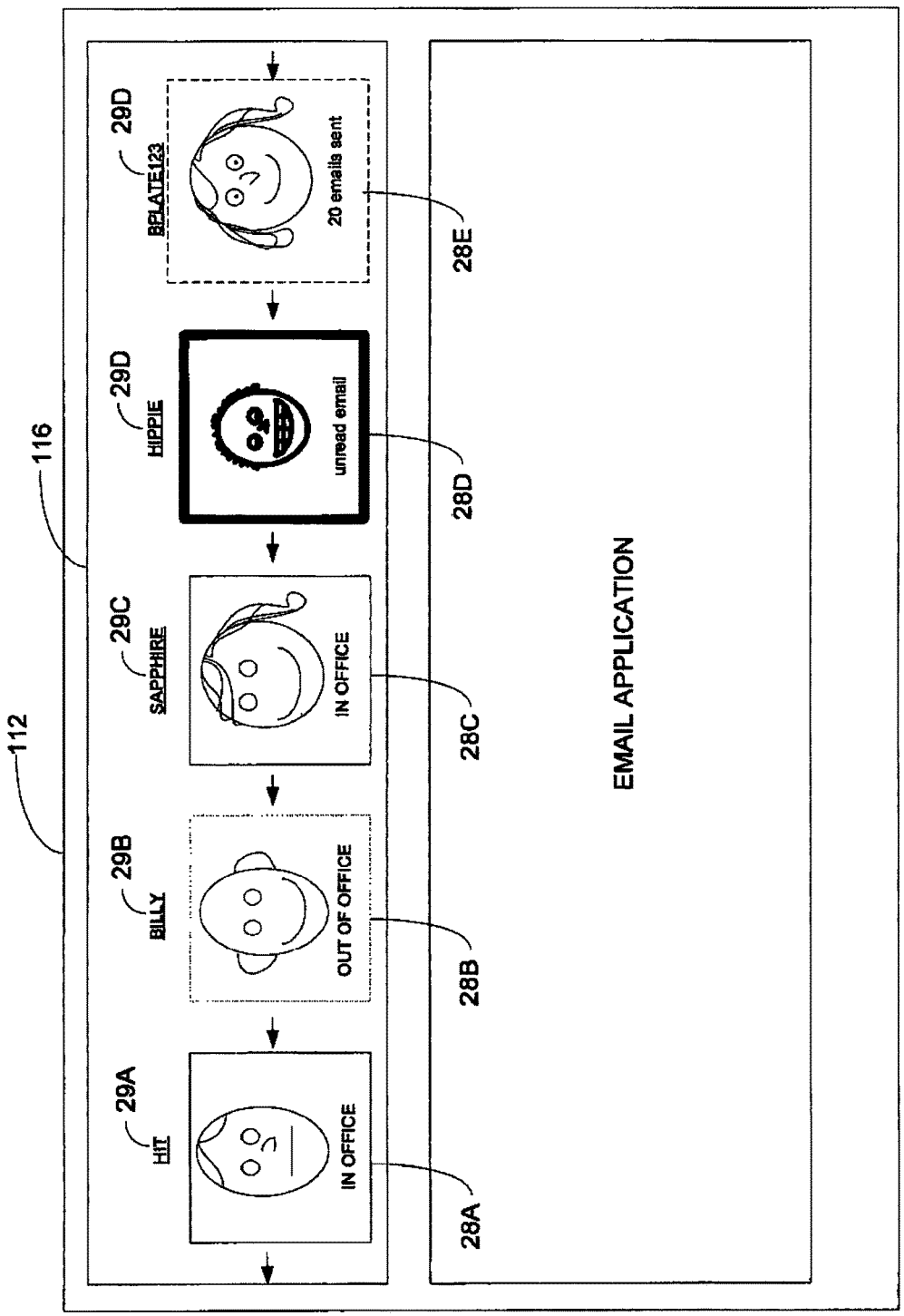

ON-LINE INTERACTION SYSTEM

CROSS REFERENCE TO RELATED APPLICATION

This application is a divisional of U.S. patent application Ser. No. 11/845,664, filed Aug. 27, 2007, which is a continuation in part of U.S. patent application Ser. No. 11/627,326, filed Jan. 25, 2007, which issued on May 15, 2012 as U.S. Pat. No. 8,180,852, and is a continuation in part of U.S. patent application Ser. No. 11/619,520, filed on Jan. 3, 2007, which issued on Apr. 2, 2013, as U.S. Pat. No. 8,413,059, the disclosures of which are herein incorporated by reference.

BACKGROUND

People use email and chat rooms to interact with each other over electronic networks such as the Internet. Although the advance of the Internet and networking technology in general has improved interaction and communication between people, the tools available for promoting or enabling these interactions are relatively primitive. For example, to interact with a particular person online, a user typically has to manually identify and enter an Internet email address or on-line user name associated with another person. Identifying these cryptic email addresses or user names is at best cumbersome and hinders the interactions between people over electronic networks. The disclosure that follows solves this and other problems.

SUMMARY OF THE INVENTION

An avatar display system monitors the activities or status of different members on a network site. Avatars representing the different members are displayed in conjunction with an on-line application according to the different identified member activities or status. In one embodiment the avatars are scrolled across a display page as a human ticker. The avatars can also be used to identify different email message conditions and different contact relationships.

BRIEF DESCRIPTION OF THE DRAWINGS

FIG. 2 is a flow diagram showing some of the operations performed by the avatar display system in FIG. 1.

FIG. 4 shows another example of how avatars are displayed by the display system.

FIG. 9B is a flow diagram showing how avatars are filtered.

FIGS. 10, 11A, and 11B show how the avatar display system is used in conjunction with an email system.

DESCRIPTION OF EXAMPLE EMBODIMENTS

Several preferred examples of the present application will now be described with reference to the accompanying drawings. Various other examples of the invention are also possible and practical. This application may be exemplified in many different forms and should not be construed as being limited to the examples set forth herein.

Figure 1:
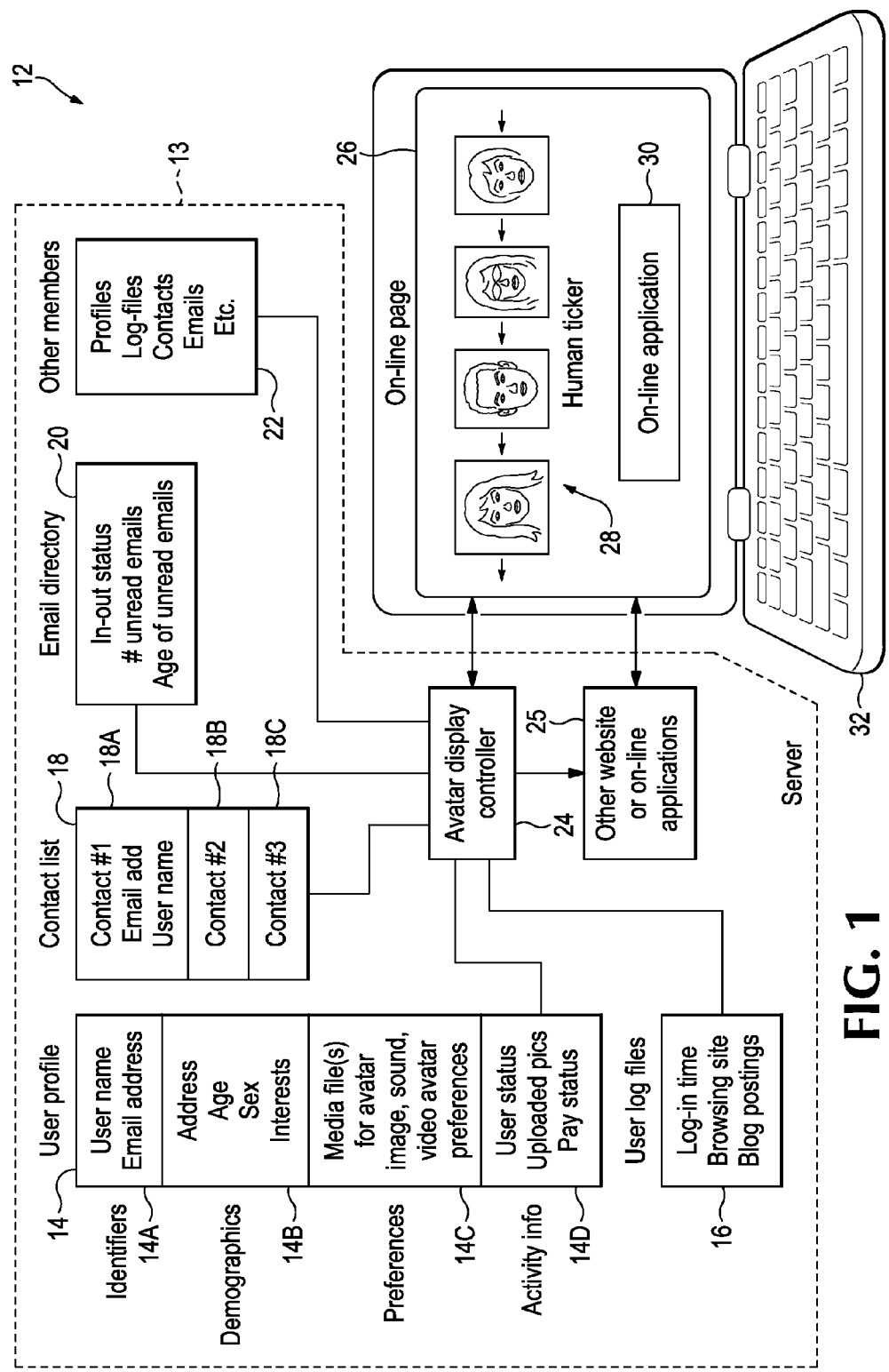
FIG. 1 illustrates an example avatar display system.

FIG. 1 illustrates an example avatar display system 12. An avatar display controller 24 displays different avatars 28 in a computer page 26 displayed on the screen of a computer 32. The avatar display controller 24 may be software that is executed by a computer 13 or computer logic.

In one example, computer 13 is a server or other type of network processing device that either stores or accesses information from another computer, that includes a user profile 14, log files 16, contact list 18, and an email directory 20. The computer 13 may also store or access the profiles, log files, contacts, and email directories 22 for other members of a same web-site, Local Area Network (LAN), or other on-line application.

In one embodiment, the computer 13 communicates with multiple different computers 32 for a particular website. For example, a user of computer 32 may access web site applications 25 that are operated on computer 13 via the Internet. In another embodiment, the computer 13 may be a server in an enterprise or in a residential location that operates different on-line applications 25 that are accessed by computer 32 via a LAN connection.

The computer 32 may be a Personal Computer (PC), lap-top computer, cellular telephone, Personal Digital Assistant (PDA), Internet Protocol (IP) phone, IPTV, or any other type of wired or wireless device that accesses the different website or on-line applications 25.

Any combination of web or on-line applications 25 may be located on the same or different computers 13. Similarly, the profiles 14, log files 16, contact lists 18, email directories 20, and other similar user or member information 22 may be located on a same computer 13 or may be distributed on multiple different computers. However, for simplicity of illustration, all of the on-line applications 25 and associated information 14-22 is shown contained on computer 13.

Avatar Display Controller

Avatars 28 are Internet website or on-line representations or identifiers of a particular user, member, organization, event, content, notification, or any other piece of information that may need to be communicated to others. The avatars 28 can take the form of two or three-dimensional images, icons, sounds, video clips, text, or any other identifier of a particular human-being, content, or event associated with a user name, email address, or other on-line identifier.

Avatars 28 can also take the form of icons that are associated with different types of events or different types of information. For example, a user may not necessarily want to display an image of themselves to other members. Alternatively, the user may want display an icon avatar to other members representing a word document, spread sheet document, power point document, etc. The icon avatar notifies other members that the document exists and further allows each of the other members to see the document simply by selecting the icon avatar 28. Switching from an avatar containing an image of the user to an icon avatar that represents a word document written by the user immediately notifies others that the user has completed drafting a document associated with the icon avatar.

Other avatars may not necessarily be associated with a user or document, but associated with an activity or event. For example, a user may want to notify other members of a party or meeting on a particular day. The avatar representing this event can be selected in the user profile 14 to replace another avatar that contains an image of the user.

In yet another embodiment, the avatars 28 may contain additional status information associated with the user. For example, the avatar 28 may provide different bordering or colors according a preferred communication method. For example, any users that prefer to be contacted via email may have a black border around their avatar and users that prefer to be contacted via instant messaging may have a blue border around their avatar. Clicking on the avatar will then automatically connect to the user via the preferred communication method.

The avatar display controller 24 monitors combinations of different information 14-20 associated with a particular user and possibly other information 22 associated with other members of the web-site or other on-line application 24. Based on this monitoring, the controller 24 displays different avatars 28 that provide the user of electronic page 26 with more intuitive and easier to access information about other on-line members.

The user profile 14 may include Internet or on-line identifiers 14A such as a user name and email address. Demographic information 14B may include the home or business address, age, and sex of the user; and may identify other user interests. For example, the user interests in demographic information 14B may identify particular sports, groups associations, hobbies, etc.

Avatar preferences 14C in user profile 14 may identify what image, sound clip, video clip, picture, etc. to display as the avatar for the user of profile 14. Avatar preferences 14C may also identify how avatars for other members should be displayed. For example, a default avatar preference may simply cause controller 24 to randomly display avatars for any members that are currently on-line. Alternatively, the user may change the avatar preferences 14C to only display avatars for on-line members that are in the user's contact list 18. A variety of other avatar preferences 14C can also be configured and will be described in more detail below.

Activity information 14D identifies particular involvement, member status, activities, etc. associated with the user. For example, U.S. patent application Ser. No. 11/1627,326, filed Jan. 25, 2007, entitled: APPARATUS FOR INCREASING SOCIAL INTERACTION OVER AN ELECTRONIC NETWORK (now U.S. Pat. No. 8,180,852), is herein incorporated by reference. This application describes a website that assigns points to users according to different on-line social interactions. For example, points are awarded according to a number of uploaded pictures and associated rankings by other members. Activity information 14D identifies these activities and/or the points or status awarded these activities.

Activity information 14D may also identify payments made by the user. For example, a user may pay money to join a website. Paying users may then receive a different member status from other members that join the website for free. In one example, a user may pay the operators of the website to display their avatar 28 differently than the avatars displayed for other non-playing website members.

Contact list 18 may include any of the conventional contact information. For example, the contact list 18 may contain the name, email address, home/business address, phone numbers, etc. of people known by the user.

Email directory 20 may include any data typically associated with the email messages and configurations contained in a user email system. For example, the email directory may contain all of the emails sent to the user, identify the number of unopened emails, identify the time when each email was received, etc. The email directory 20 may also include other email configuration data such as an out of office status identifier. For example, email configuration data may automatically send email notifications when a user is not in the office.

Member information 22 contains some or all of the same information 14-20 for other members or users of the same on-line application or website. For example, all of the users that sign-up for a particular website and have an associated user profile may be considered as other members. Similarly, persons working for a same enterprise that have a user login and password may be considered members of the same on-line application by the controller 24. According, the member information 22 may contain information for these other enterprise employees. The other members could also be considered a subgroup within an enterprise, such as the employees associated with a particular email group or organization department. For example, the other member information 22 may only be associated with employees working in the accounting department of a particular enterprise.

FIG. 2 shows some of the basic operations that may be performed by the avatar display controller 24 in FIG. 1. In operation 40, user profile 14 is checked for any avatar preferences. As described above, the avatar preferences 14C may identify the photograph, sound clip, image, video clip, etc. to use with the user's avatar 28. Other avatar preferences 14C may also determine what avatars to display for other members. In operation 42, the other member profiles and/or log files 22 are checked according to any user avatar preference settings 14C. For example, a default avatar preference 14C may direct the avatar display controller to randomly display avatars for all members that are currently on-line. Accordingly, operation 42 would identify any members that are currently on-line, and operation 44 would display the avatars for the identified on-line members.

Alternatively, the avatar settings identified in operation 40 may direct the controller to only display avatars for known on-line members identified in the user contact list 18. In this example, operation 42 may first determine which members are currently on-line and then determine which of the on-line members are identified in the user contact list 18. The avatars 28 for the known on-line members are then displayed in operation 44.

In yet another embodiment, the avatar preferences in operation 40 may indicate that avatars only be displayed for members who have posted blogs to a particular website or webpage. Operation 42 determines which members have posted blogs on the identified website and operation 44 displays the avatars 28 for the identified members.

In operation 46, the user log files 16 may be periodically monitored. The avatars currently being displayed may then be dynamically changed in operation 48 according to the monitored user log file 16. For example, the user could have configured the avatar preferences 14C to only display the avatars for members that are currently accessing or browsing a same website location. Operation 46 monitors the user log files 16 to determine which webpage the user is currently accessing or browsing. Operation 48 then displays the avatars 28 for other members currently accessing or browsing the same webpages.

The user may configure other avatar preferences 14C. For example, the user may request only displaying avatars, or request displaying special avatars, for members that have just recently logged into the website or other on-line application.

It should be understood that the examples given above and further examples given below only describe some of the unlimited number of user criteria that may be used to control what avatars are displayed to particular users. Any arbitrary criteria can selected or input into any arbitrarily provided field to control what information or avatars are statically or dynamically displayed on page 26. For example, avatars can be displayed for any combination of on-line male members, on-line female members, zip codes, etc.

In another business application, an enterprise manager can select parameters that cause only the avatars to be displayed for employees that have some configurable amount of sales for some configurable type of product for some configurable time period based on a configurable employment date. For example, a manager may configure the system in FIG. 1 to display the avatars for sales staff that have sold more than $100,000 worth of software and that have only been working for the company for less than one year.

Displaying Avatars

Figure 3A:
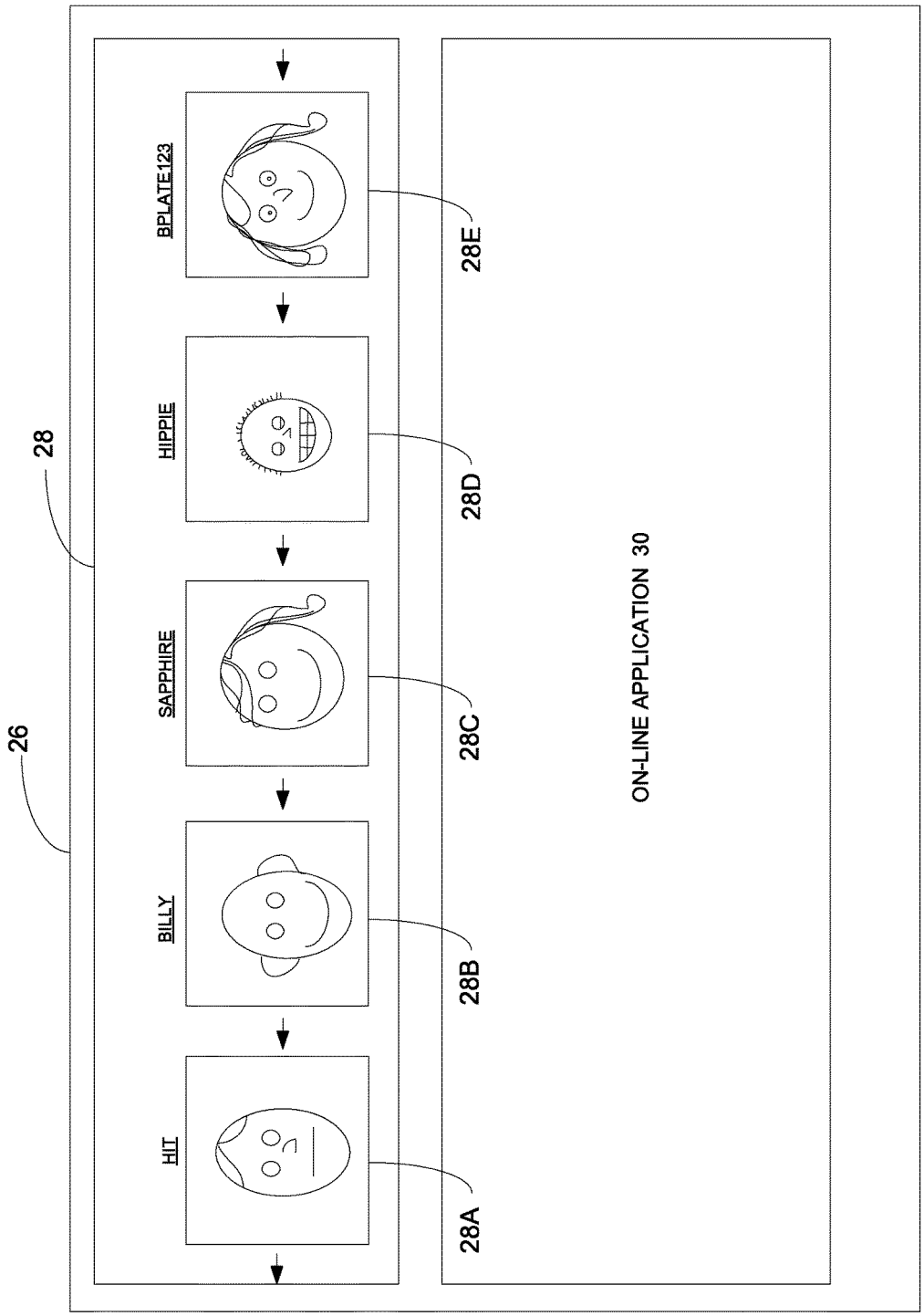
FIGS. 3A-3C examples of how avatars are displayed by the display system.
Figure 3B:
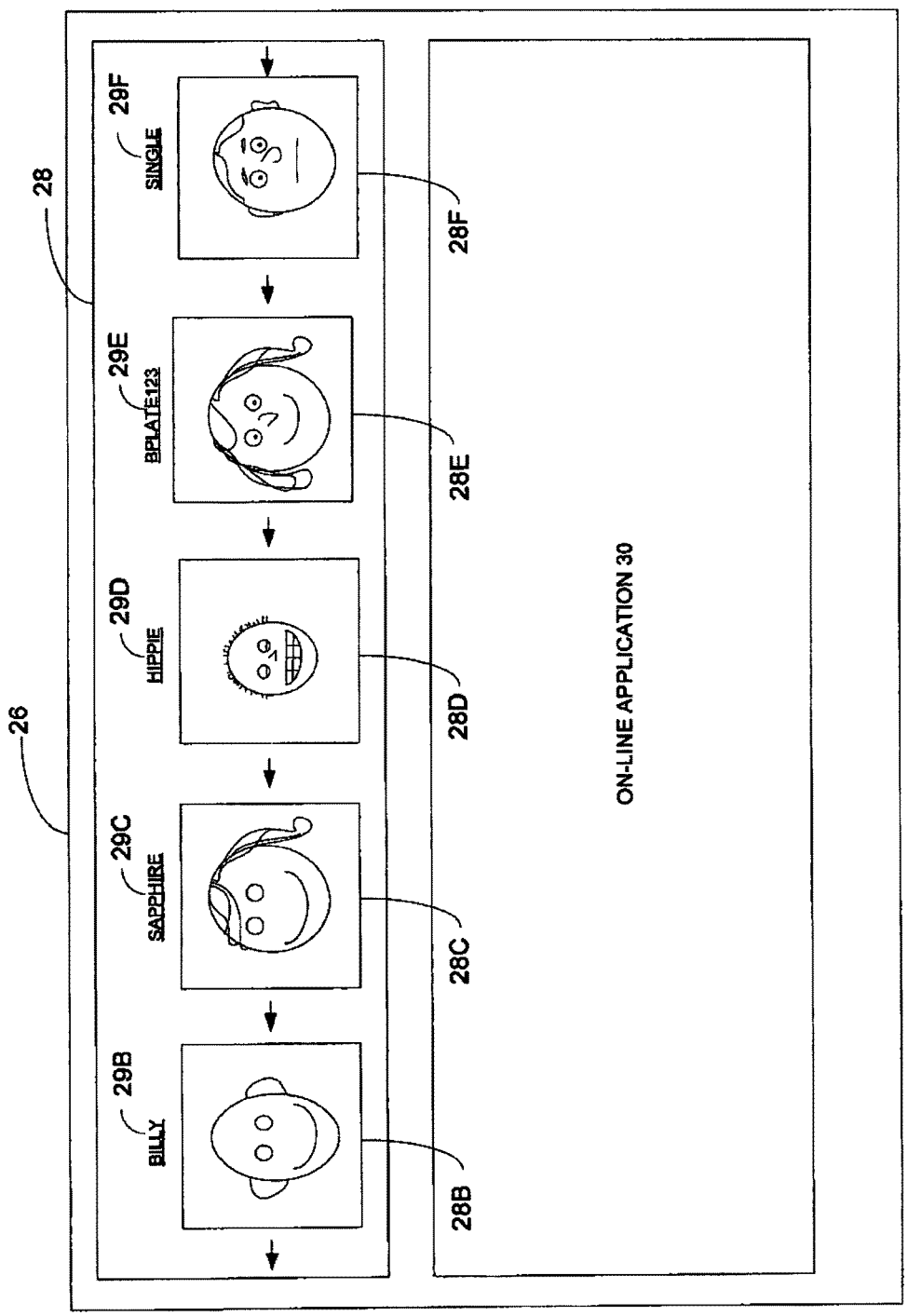
Figure 3C:
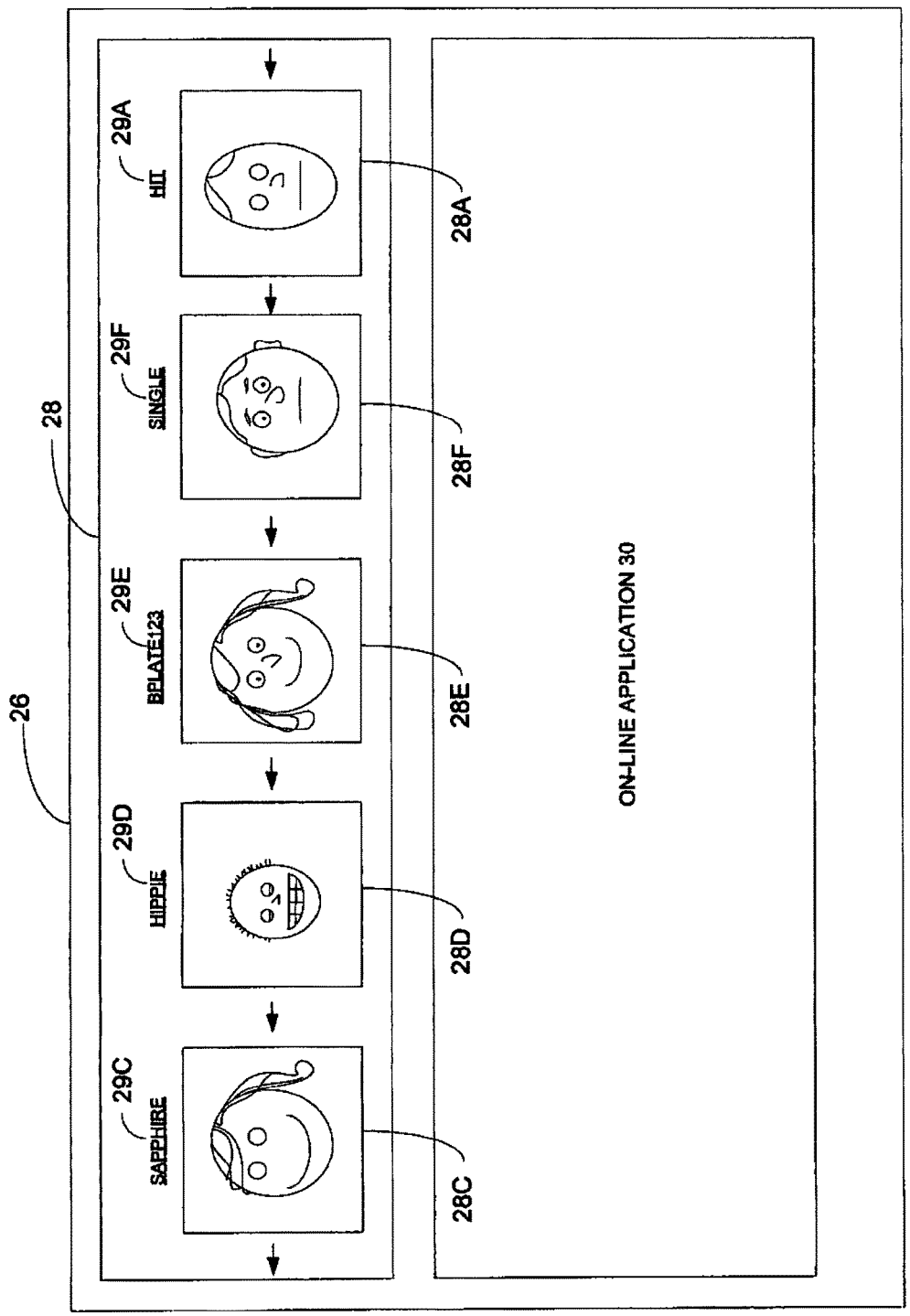

FIGS. 3A-3C show one example of how the avatars 28 are scrolled across electronic page 26. A lower part of the page 26 may display any items for the related on-line application 30. For example, the on-line application 30 may display webpages for a website application, email in-box for an email on-line application, or display any other user interface for any on-line application that may be used in combination with avatars 28.

In this example, different avatars 28A-28E are displayed in a vertical row along the upper half of display page 26. In this example, the avatars 28A-28E constantly move from right to left, similar to a stock ticker. This type of avatar display is referred to generally as a human stock ticker. Each avatar 28A-28E may also have an associated link 29A-29E, respectively, that in one example display the associated member user name.

Clicking either on the link 29 or on the associated avatar 28 may then cause the on-line application 30 to perform a particular operation related to the associated member. For example, clicking on link 29B may cause the application 30 to move to a personal website for the member BILLY associated with avatar 28B. For an email on-line application 30, selecting avatar 28B could either open an email message that contains the email address of the associated member BILLY. Alternatively, selecting the avatar 28B could display all emails received from the associated member BILLY.

Any other associated on-line interaction can also be captured or performed. For example, the on-line application 30 could notify the member associated with the selected avatar 28B that the user clicked or hovered over their avatar, thus promoting possible further communication between the two on-line members. This, in a way, simulates an actual face to face social interaction where two people may first catch eye contact and then continue the social interaction by actually initiating a conversation.

FIG. 3B shows an instant in time after FIG. 3A. Comparing FIGS. 3A and 3B, the left most avatar 28A in FIG. 3A scrolls off the screen at the next instant in time shown in FIG. 3B. All of the remaining avatars 28B-28E are scrolled to the left and a new avatar 28F for another member moves into the right most avatar position in FIG. 3B. FIG. 3C shows an even later instant in time after FIG. 3B. Here, the avatar 28A from FIG. 3A loops back to the right most position with all the other avatars 28C-28F all scrolled further to the left. The previous left most avatar 28B from FIG. 3B scrolls off the left end of the display page 26. As described above, the avatars 28 may be randomly displayed showing the members of a website application or other on-line application that are currently logged or signed in. Displaying the avatars 28 of the log-in members in combination with scrolling the avatars 28 across the display page 26 provides a more dynamic technique for notifying users of different member status. Statically displaying avatars with no motion may cause the user to stop viewing the avatars and thus not notice members that only recently logged in. Thus, the 'human stock ticker' can be more effective in notifying the user of other on-line members, and thus promoting or simplifying social interactions.

Alternative Avatar Displays

It should be understood that the avatars 28 can be scrolled in any configurable or selectable pattern and direction. For example, FIG. 4 shows another embodiment where the avatars 28 are scrolled around in a circle or square pattern in a counter clockwise direction. In this example, each avatar 28 may continuously fade in and out with the avatars of other on-line members. In another embodiment, the avatars 28 may be displayed vertically down either side of the display window 26.

Figure 5:
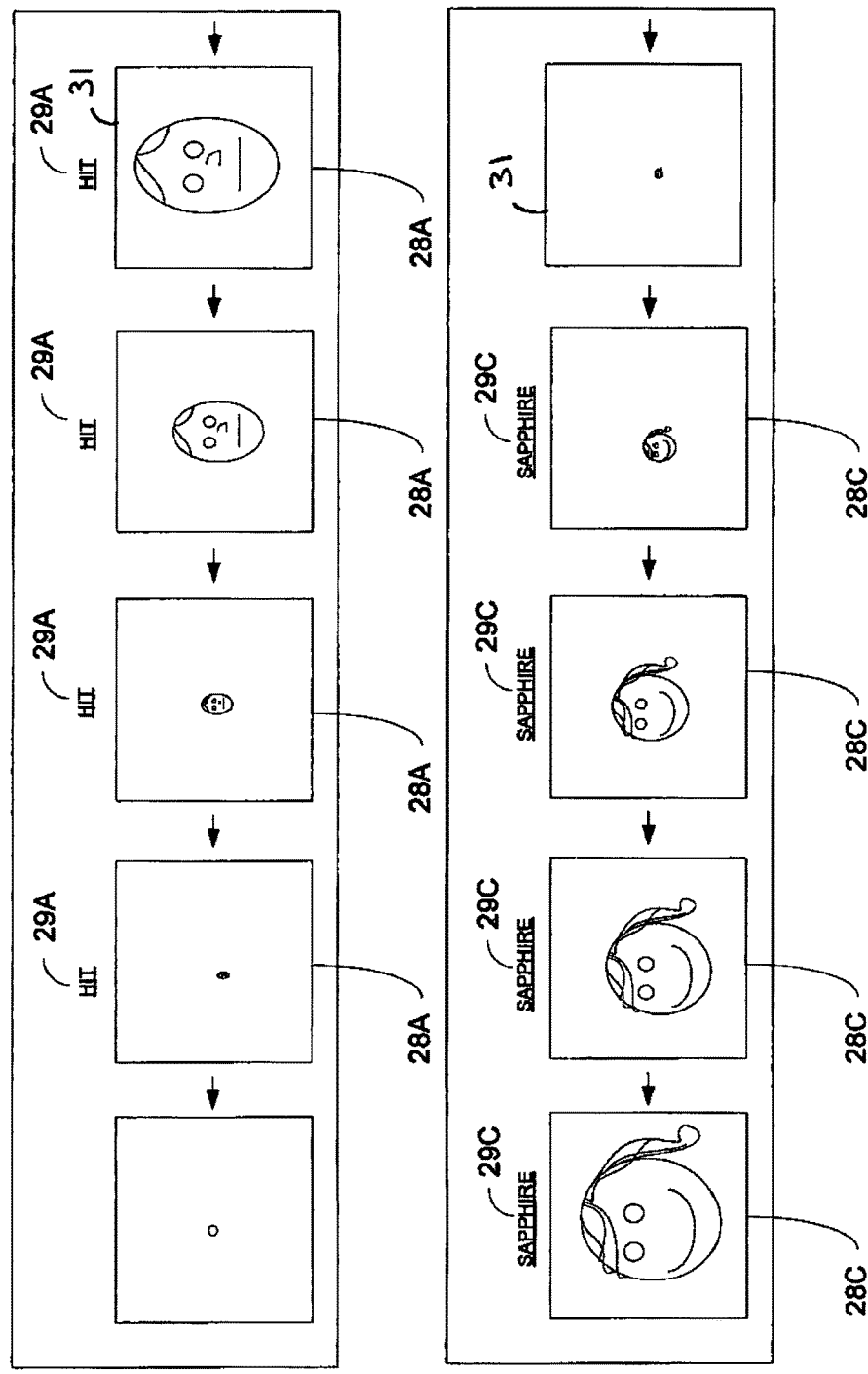
FIG. 5 shows how avatars are faded in and out.

FIG. 5 shows in more detail how avatars 28 may be faded in and out to show either the avatar of another member or to change the avatar for the same member. Any number of existing display techniques can be used to dynamically alter the currently displayed avatar. The example shown in FIG. 5 is purely for illustrative purposes and any other fade in-fade out technique could just as easily be used.

In FIG. 5, a first avatar 28A associated with a first on-line member HIT is displayed in full size and then faded out as the avatar 28A moves to the left. Images or other media associated with different members may be faded out as images or media associated with another member is faded into the same avatar slot while the avatar slot is being scrolled across the computer screen.

Alternatively, avatar 28A may be displayed in a static non-scrolling position and other avatars faded in and out of the same non-scrolling avatar position. For example, a second avatar 28C may be faded into the same avatar position 31 as avatar 28A is faded out. The avatar 28A is shown fading out by getting smaller in different positions moving toward the left and a second avatar 28C is shown fading into the same position by getting larger in different positions moving toward the left. However, in the static avatar example mentioned above, the fad-out of avatar 28A and the fad-in of avatar 28C may all happen in the same avatar location 31.

In another embodiment, the avatars may not necessarily fade-in and fade-out by changing the image size. Alternatively, the brightness of the first avatar may simply be reduced until it can no longer be easily seen. A brightness level of a second avatar is then gradually increased from a very low non-viewable intensity to a normal easily viewable brightness.

Of course any other type of fad-in and fad-out technique can also be used. For example, small pixels of the same or different colors may be randomly displayed over the first avatar until the first avatar is completely covered and no longer viewable. Then the same or different pixels may be gradually removed to eventually display the second avatar.

Thus, either a dynamic scrolling activity, a dynamic fad-in/fad-out activity, or both, can be used to provide the user with better member on-line status notifications. Of course, in another embodiment, avatars may be statically displayed with no scrolling or fad-in and fad-out operations. Any combination of these different display options may be configured by the user in the user preferences 14C.

Similarly, any audio clips, video clips, etc. associated with a particular member may be faded in or out for the associated member. The images associated with a particular member may not necessarily be photos of the member. For example, the images may be an image or picture of something the member wishes to associate with. For example, the image may be of a tiger, cartoon character, etc.

The member may also combine this image with an actual picture of themselves. For example, the avatar 28 associated with the member may first display a picture of a tiger. The tiger avatar may then fade out and the actual picture of the member faded in. This fade in-fade out technique allows the member to display what they believe to be their true inner self, such as a tiger. The tiger avatar is first displayed and then faded out. The actual picture of the member is then faded in showing the actual outer self of the member.

Figure 6:
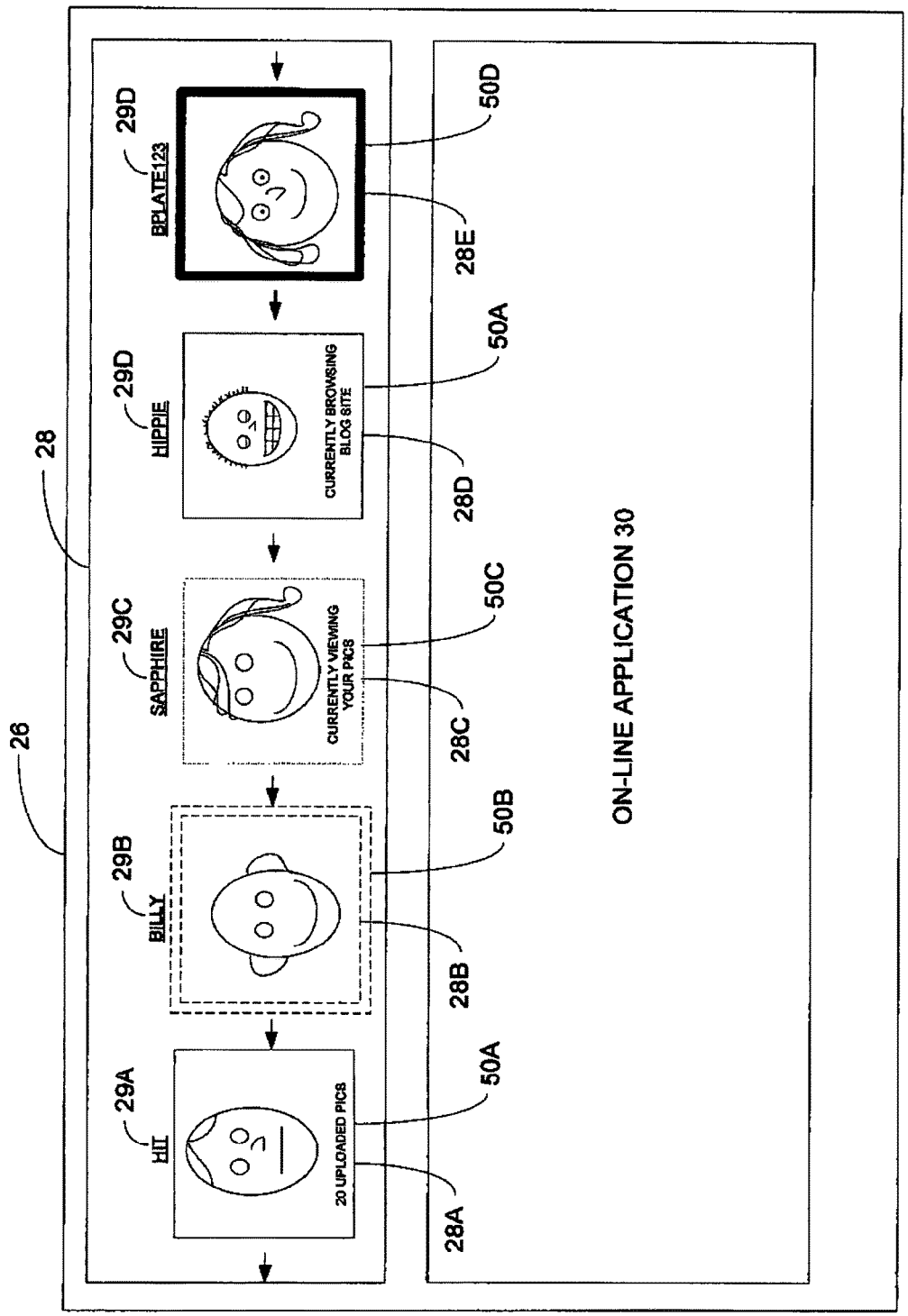
FIG. 6 shows how the avatars are varied according to different on-line member status.

FIG. 6 shows another feature of the avatar display system that varies the avatar frames 50 according to different member status or activity. The avatar frames 50 are shown as different types of dashed, dotted, and bolded lines in FIG. 6. However, it should be understood these different lines can represent any color, outlining, shape, pixel intensity, avatar shape, avatar color, avatar intensity, audio clip, film clip, etc. that may further distinguish between the displayed avatars 28.

Figure 7:
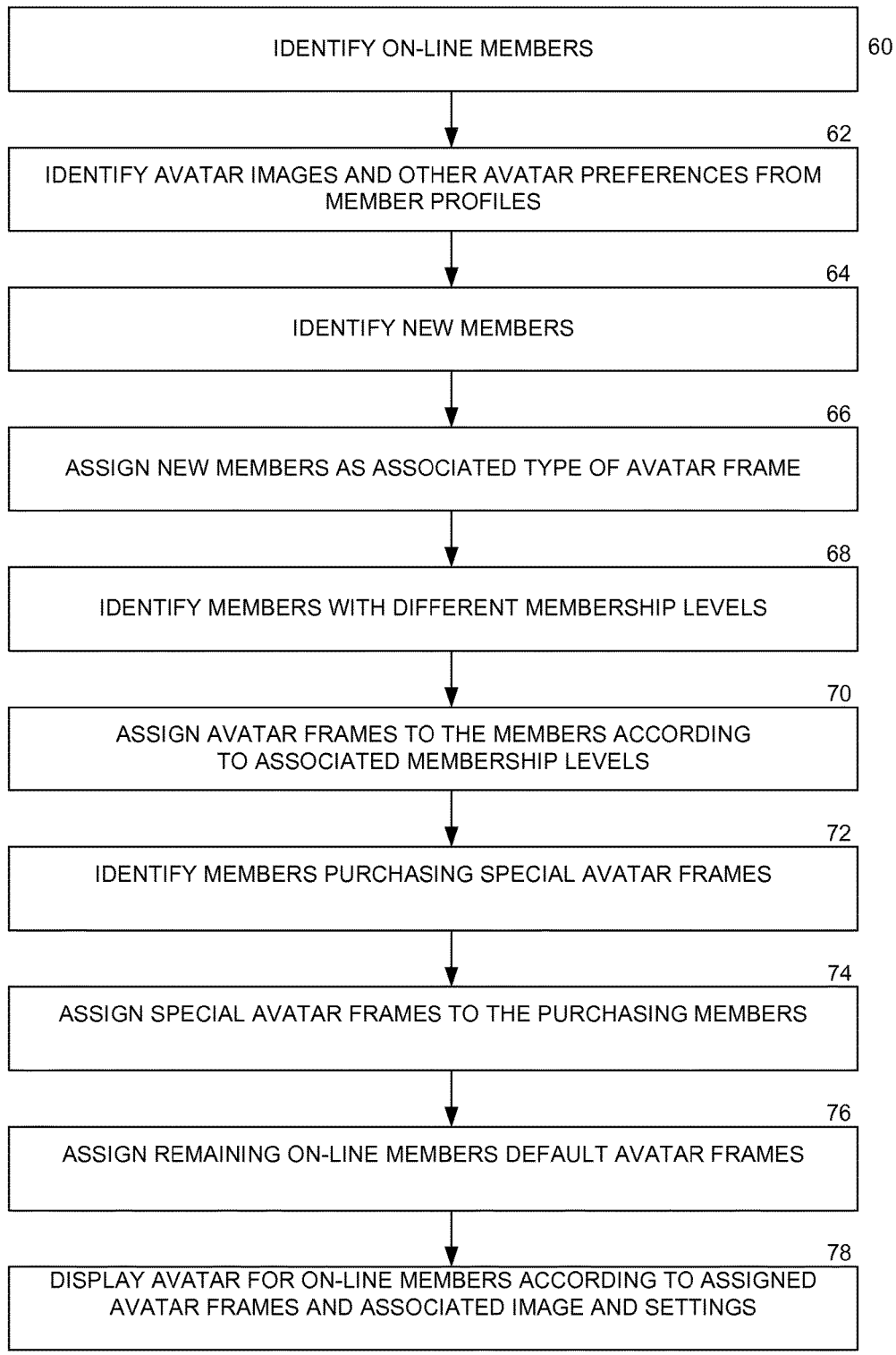
FIG. 7 is a flow diagram showing in more detail how the avatars are varied according to different on-line member status.

Referring to both FIGS. 6 and 7, operation 60 of FIG. 7 identifies all members that are currently on-line. Operation 62 identifies the avatar images and any other avatar preferences for the on-line members. In FIG. 6, avatar 28A may be displayed with a generic default frame 50A that is generally displayed for all on-line members that are not classified under any other avatar category.

The member associated with avatar 28B has been identified by the avatar display controller 24 in FIG. 1 as a new member. For example, the profile associated with avatar 28B may indicate the member has only been signed up to the on-line application 30 for less than one week. Accordingly, the new member is assigned an associated new-member avatar frame SOB in operation 66.

In operation 68, different member status levels are identified. As described briefly above, some on-line applications 30 may assign members points or other classifications. For example, the social networking on-line application 30 described above assigns points to members according to the number of uploaded pictures, the number and types of ratings received from other members, and generally the amount of social interaction with other members.

These points determine a particular membership level, such as master member, intermediate member, novice member, etc. The membership levels are identified in operation 68 and different avatar frames 50 assigned in operation 70 according to the identified membership level. For example, in FIG. 6, the member associated with avatar 28C may be identified as a master member. Accordingly, the member is assigned a master member avatar frame SOC in operation 70.

Some members may pay to have special frames displayed along to their avatars to foster more member attention. The avatar display controller in operation 72 looks in the member profiles for any members that have purchased special avatar frames. The purchased avatars frames are then assigned to the avatars for those purchasing members in operation 74. For example in FIG. 6, the member associated with avatar 28E may have purchased an emboldened frame 50D.

As described above, on-line members that do not qualify under any of these special avatar frame categories may be assigned a default avatar frames in operation 76. For example, similar to avatar 28A, the member associated with avatar 28D also does not qualify for any other special avatar framing. Accordingly, avatar 28D is assigned the same default frame 50A as avatar 28B.

In operation 78, the avatars 28 for all of the on-line members are then displayed with their configured avatar settings and assigned avatar frames. Thus, different member categories, activities, or status can be distinguished using the avatars 28.

Any other information may also be displayed along with the avatars 28. For example, avatar 28D indicates that the associated member is currently browsing the same blog site as the user. In other examples, avatar 28A identifies the number of photos uploaded by the associated member and avatar 28C indicates the associated member is currently viewing the user's personal webpage or photos.

Figure 8:
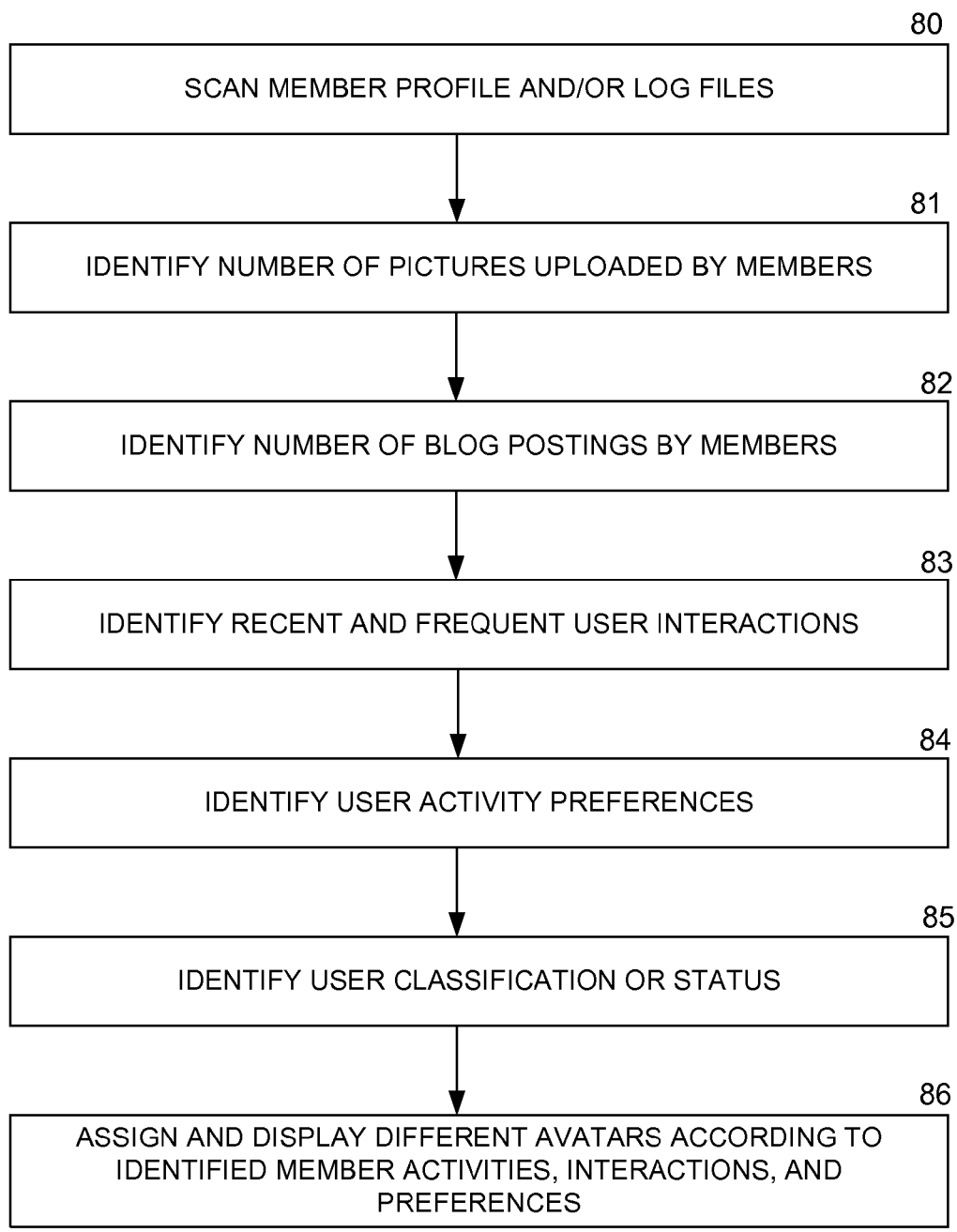
FIG. 8 is a flow diagram showing how avatars are varied according to different on-line member activities.

FIG. 8 shows other member activities that can change the type of assigned avatar 28 or type of avatar frame 50. In operation 80, the member profiles or log files are scanned for different activities. In one example, operation 81 identifies the number of pictures uploaded by the member and operation 82 identifies the number of blog postings by the member.

Operation 83 identifies recent or frequent user activities. For example, the user may have recently uploaded photos or recently posted a message on a blog. Similarly, other members that have recently or frequently interacted with the user can be identified. Other members that have recently exchanged messages with the user or who have recently exchanged a virtual gift from the user can also be identified. Other members that have a large number of similar activities can also be identified. For example, the user may frequently access a particular web-site. Other members that also frequently access the same website can be identified.

Recent and frequent user activities can both be identified and weighted to determine which avatars are displayed to which members. For example, fewer more recent activities may be identified and a larger number of similar possibly less recent activities may also be identified. All these parameters can be identified by the controller 24 by searching the user log files 16 and the other member information 22 in FIG. 1.

Operation 84 may also search for user activity preferences in the preferences 14C shown in FIG. 1. For example, a user may indicate in preferences 14C a desire to play on-line games. In another example, the activity preferences may also indicate a request for other members to buy the user electronic issued virtual gifts or virtual drinks. This can be thought of as a virtual "wish list".

Operation 85 determines the user classification or status and displays different avatars according to that classification or status. The contact list 18 and/or the preferences 14C in FIG. 1 may be checked to determine how these classifications or status relate to other members. For example, a first formal picture of the user may be provided in preferences 14C for displaying as an avatar to co-workers and another casual picture may be provide in preferences 14C for displaying as an avatar to other members of an on-line social networking site or to other user contacts. Other pictures may be provided for displaying to females, males, different age groups, etc.

Different avatars 28, or different associated frames 50, may then be displayed or highlighted in operation 86 according to the number of specific activities identified in operations 82-85. For example, the controller 24 in FIG. 1 may determine that the user has set a preference indicating a desire to play on-line games. The controller 24 then generates a particular avatar that identifies the user as a "gamer". This gamer indication may be a particular color, shading, icon, sound, movement, etc. associated with the avatar.

Other interaction preferences may also be associated with the displayed avatars. For example, a user may request virtual gifts in the activity preferences identified in operation 84. The avatar for that user may be displayed along with a small gift package that represents the requested virtual gift user activity.

In another example, the controller 24 identifies all of the recent and frequent activities of the user and then only displays the avatars for other members that are associated with those activities. For example, the controller 24 may only display the avatars for other members that have recently exchanged messages with the user and display the avatars for other members who have recently accessed the same blogs as the user.

A formal avatar picture may be displayed to co-workers identified in member information 22 in FIG. 1. A casual avatar picture may then be displayed to other non-work related social members. In another example mentioned above, a first avatar contained in preferences 14C may be displayed to female members identified in member information 22 and a second different avatar in preferences 14C may be displayed to males members identified in member information 22.

In another embodiment, different avatars may be displayed to members having different status levels. For example, an expert level member on a social website may only be shown the avatars of other expert level members. Alternatively, a first user avatar may be shown to novice level members and a second user avatar may be shown to expert level members. Similarly, users identified as software programmers in their user profiles may only be shown the avatars of other software programmers while a manager at the same enterprise may be shown the avatars of all employees.

The examples above are only some of the substantially infinite number of activities or interactions that can be associated with the displayed avatars.

Filtering

The avatars 28 displayed to a particular user may not necessarily include all of the on-line members. For example, a particular user may only desire to see avatars for known members or members having particular demographics. In these cases, different avatar display preferences 14C in FIG. 1 may be set to filter certain avatars before being displayed to the user.

Figure 9A:
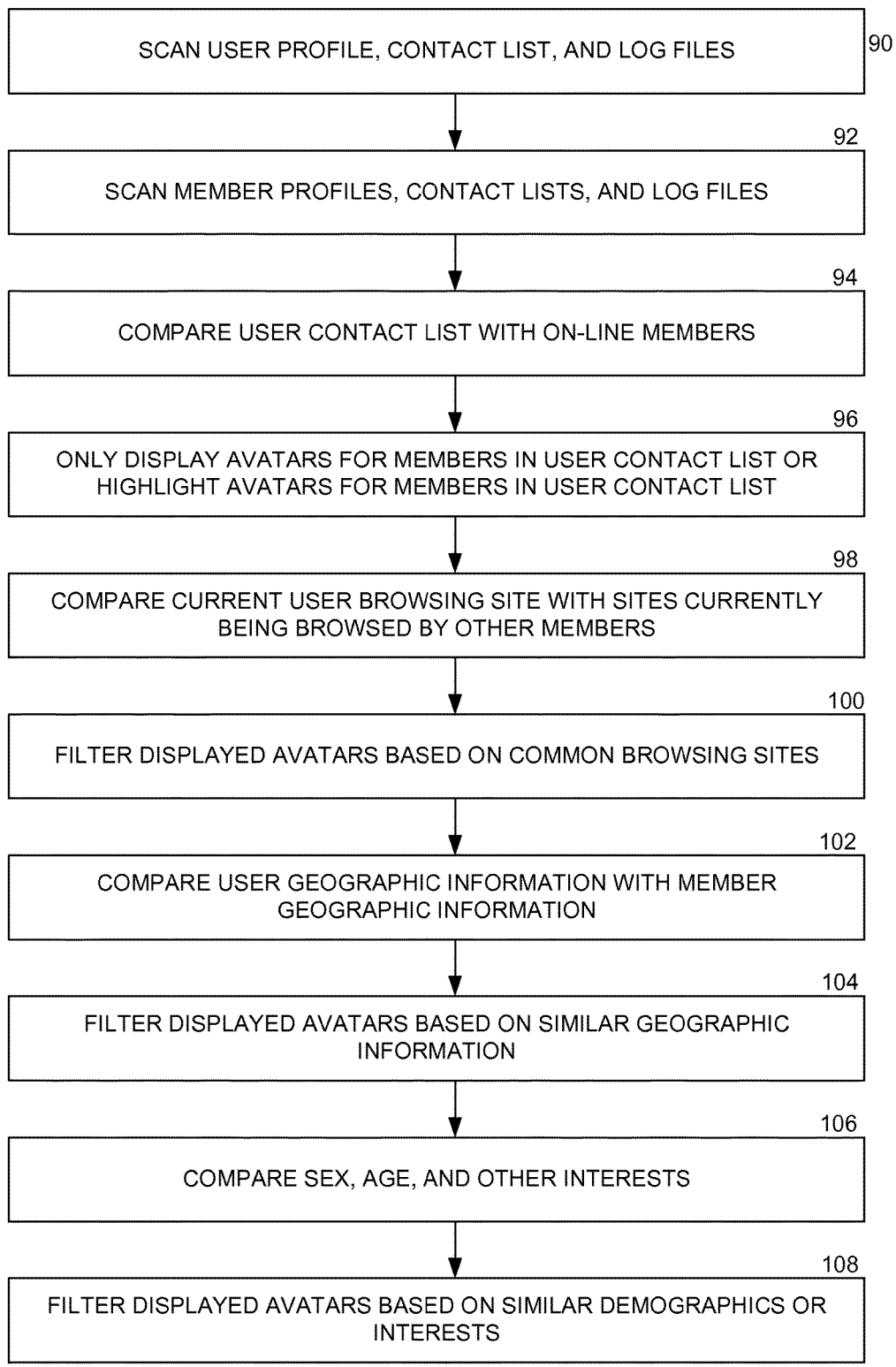
FIG. 9A is a flow diagram showing how avatars are displayed or varied according to different related member information.

FIG. 9A shows just some of the different parameters that may be used to filter avatars. Any combination of the different filtering criteria described in FIG. 9A may be used and other criteria not shown in FIG. 9A can also be used.

Referring to FIGS. 1 and 9A, operation 90 scans the user profile 14, user contact list 18, and/or user log files 16 in FIG. 1. Similarly, operation 92 may scan the profiles, contact lists, and log files 22 for other members. Operation 94 compares the user contact list with the identified on-line members. Operation 96 displays any on-line members that are contained in the user contact list 18. Other on-line member avatars may also be displayed in operation 96. In this case, the avatars for the on-line members contained in the user contact list (known members) may be highlighted in a distinguishing manner from other displayed avatars as shown in FIG. 6.

Operation 98 identifies the webpage or display window currently being viewed by the user and identifies other members browsing the same location in the on-line application. Operation 100 may then display the avatars for other members currently viewing the same webpage or display window. Similar to operation 96, if other avatars are also displayed at the same time, the avatars for the members browsing the same on-line locations may alternatively be highlighted in a distinguishing manner as shown in FIG. 6.

Operation 102 may compare the geographic information 14B and/or avatar preferences 14C in the user profile 14 with the geographic information 22 of other members. Operation 104 may then displays the avatars 28 for members located in the same city, state, or other geographic region specified by the user.

Other demographic or social information may also be used as a basis for displaying avatars. For example, operation 106 may compare the sex, age, or other interests specified in demographic information 14B with related information 22 for other members. The avatars for members having similar demographics or other interests are then displayed in operation 108. For example, the user can configure profile 14 to only display avatars for women members that live within 20 miles of the user.

FIG. 9B shows how other aspects of the filtering system can be used for any combination of user selectable or user non-selectable preconfigured parameters. For example, certain categories of users may not have the ability to control filtering while other categories of users can control the types of filters associated with their own avatars. Different types of filtering may be provided to users based on different status levels, different user activities, or according to an amount of money paid by the user.

Referring to both FIG. 1 and FIG. 9B, the controller 24 shown in FIG. 1 scans any combination of the user profile 14, log files 16, contact list 18, email directory 20, and other member information 22 to identify any parameters that may be associated with outgoing filter parameters. The user preferences 14C in FIG. 1 may identify different types of outgoing filters that the user may want to activate. For example, the user may only want to show his avatar to other on-line members that are in the user contact list 18.

In another example, the information in user demographics 14B in combination with the user preferences 14C may be used by the controller 24 to determine that avatars should only be shown to other members of the opposite sex that are within a particular user age range and are within a particular geographic distance from the user's address.

In yet another example, the controller 24 first determines if the user has paid for filtering services via the pay status indicated in activity information 14D. If the user has not paid for filtering services, then a default filtering may be used. Otherwise, the controller 24 may display different filtering options to the user. For example, the controller 24 may ask the user what type of highlighting the user wishes to apply to the outline of their avatar or may supply the user with several different options for which types of members to display the user avatar.

In another advertising application, the user may be associated with a business that wishes to advertise to particular on-line members. The business may pay to display an avatar advertisement to any on-line members that are currently accessing a particular webpage. Similarly, the business user may pay to have their advertisement avatar displayed to any on-line members within a particular geographic range of the address specified in the business user demographics 14B. Based on the amount of money paid, the advertisement avatar may be sent to a greater number of members. In another application, if enough money is paid, the advertisement avatar may override any incoming avatar filters that are described in more detail below.

In operation 93, the controller 24 calculates the outgoing avatar filters according to the identified filter parameters. For example, the derived out going filters may only send the user avatar to those members that have interests similar to those listed in the user demographics 14B. Accordingly, the controller 24 in operation 95 only sends the user avatar to the on-line members that have similar interests in their profiles while filtering the avatar from all other members.

In-coming filters can also be provided to control what avatars are shown to a particular user. For example, the user may not want to see the avatar for every on-line member. If too many avatars are displayed, the user may not easily notice the avatar of a particular member that comes on-line. The avatar of interest may simply be lost in the fray of all of possibly hundreds of displayed avatars.

To correct this potential problem, the controller 24 in operation 97 scana the same user profile 14, user log file 16, contract list 18, email directory 20, and other member information 22 for any parameters associated with different incoming avatar filters. For example, the user may configure a preference 14C that indicates the user only wants to see avatars for other on-line members that are in the user contact list 18. In another example, the preferences 14C may indicate the user only wants to see the avatars of female on-line members.

Any identified incoming filter parameters are used by the controller 24 in operation 99 to calculate the incoming avatar filters. Any avatars sent to the user are then filters according to the calculated incoming avatar filters. For example, the user may only want to see the avatars of other on-line members that are currently browsing a same website. If the user moves to another website, the controller 24 may then automatically start displaying only the avatars for members currently viewing the new website.

In another application, a manager for a particular business or group within a business may set up their preferences 14C to only display the avatars of employees that have sold more than 1 million dollars worth of equipment and that have worked for the company for less than a year. This sales and employment history information could be automatically loaded into the member information 22 by a management and sales software application. The identified employee avatars could be displayed on an on-line webpage or in the manager's business email application.

In another application, the user may specifically identify members that will always have their avatars filtered. Similar to the outgoing filters, certain incoming filters may only be available to users with a particular user status or only available to users that have paid a particular fee. For example, a user may only be able to filter incoming avatars for other members that are at or below the same status level.

Thus, the filters may be user selectable based on different criteria such as paying for a particular service or according to a particular user status or activity. In other applications, filters may be applied to different users based on different user profile information. For example, avatars of other members may automatically be filtered that do not have demographic information 14D, activity information 14D, log file information 16, and/or contact list information 18 in common with the user. In another application, the number of available filters increases with user status. For example, active users on a web-site may have access to more outgoing and in-coming filter operations.

It should also be understood that the outgoing and incoming avatars can be filtered both for on-line and/or off-line members. For example, the user may still want to see other members that are currently off-line that are within a geographic region. This allows the user to send communications or conduct other activities with persons that may not necessarily be logged in.

All of the filtering operations described above are of course only a small sample of the essentially limitless number of parameters that can be used to generate different types of outgoing and in-coming filters. As previously explained, the avatars can be any type of data that may be associated with a particular user and is not limited to pictures or images. For example, icons representing different software work product such as software spread sheets, word documents, power point presentations, etc. could also be displayed to different users based on any of the different filter parameters described above.

Electronic Mail

As described above, the avatar display system can be used in conjunction with any on-line application 30. Several examples above discussed how the avatars can be displayed according to different activities or status that members obtain on a particular website or according to activities or personal information that other members may have in common with the user. The avatar display system can also display avatars in conjunction with an electronic mail (EMAIL) application 30.

An image based electronic mail system is described in U.S. patent application Ser. No. 11/619,520, filed Jan. 3, 2007, entitled IMAGE BASED ELECTRONIC MAIL SYSTEM (now U.S. Pat. No. 8,413,059), which is herein incorporated by reference. The avatar display system 12 (FIG. 1) in one embodiment is used in combination with this image based electronic mail system.

Figure 10:
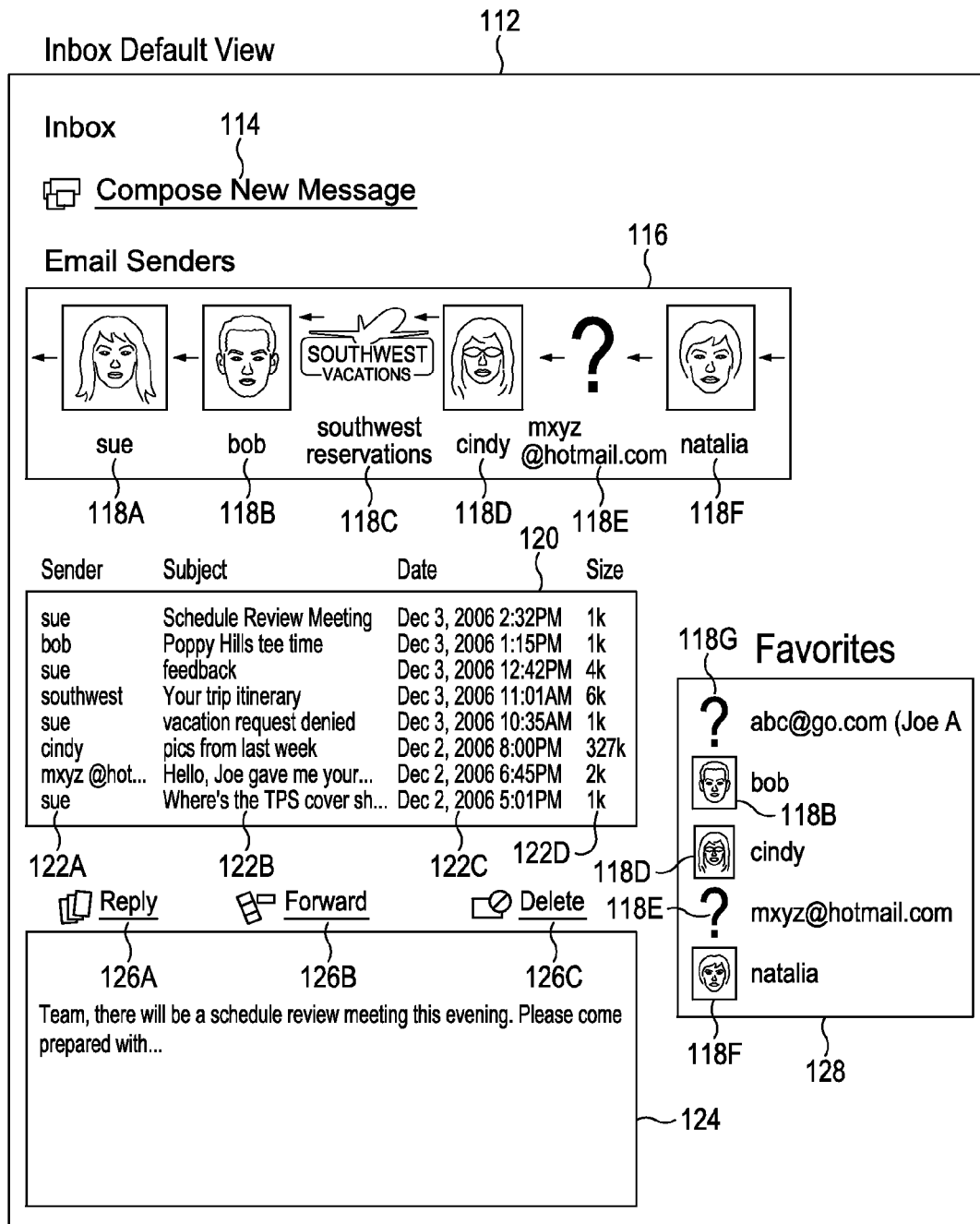

FIG. 10 shows an email in-box page 112 that includes a compose new message icon 114 that when selected brings up a new page for composing a new email message. In-box page 112 may also include a scrollable message list (message list) 120, scrollable message pane 124, and scrollable favorites list 128. The message list 120 shows a chronologically sorted list of the mostly received emails. In this embodiment, the message list 120 shows the sender names 122A, subject lines 122B, dates 122C, and size 122D for each of the chronologically sorted emails. The different email information 122A-122D displayed in message list 120 can be changed or reconfigured.

The message pane 124 shows the body of selected email messages. In an initial default condition, the body of the most recently received email in message list 120 may be displayed in message pane 124. Otherwise, the message pane 124 shows the body of a particular selected email message. The user can reply to the displayed email in message pane 124 by selecting reply icon 126A, forward the email message by selecting forward icon 126B, and delete the displayed email by selecting delete icon 126C.

Of particular interest is an email senders bar 116 that graphically displays avatars 118 for persons sending email messages to the user. In the description below; pictures, graphics, placeholders, photographs, video clips, audio clips, or any other visual or audio information used to identify an email message sender is referred to generally as an avatar 118.

The avatars 118 may be displayed statically in sender bar 116 or may be scrolled across or around the sender bar 116 similar to as described above in FIG. 3 or 4. In one configuration, the sender bar 116 may be populated with avatars 118A-118F representing some number of most recent unique email senders to the account holder (user) of in-box page 112. However, the avatars 118 may also be displayed in sender bar 116 according to other email criteria.

Figure 11A:
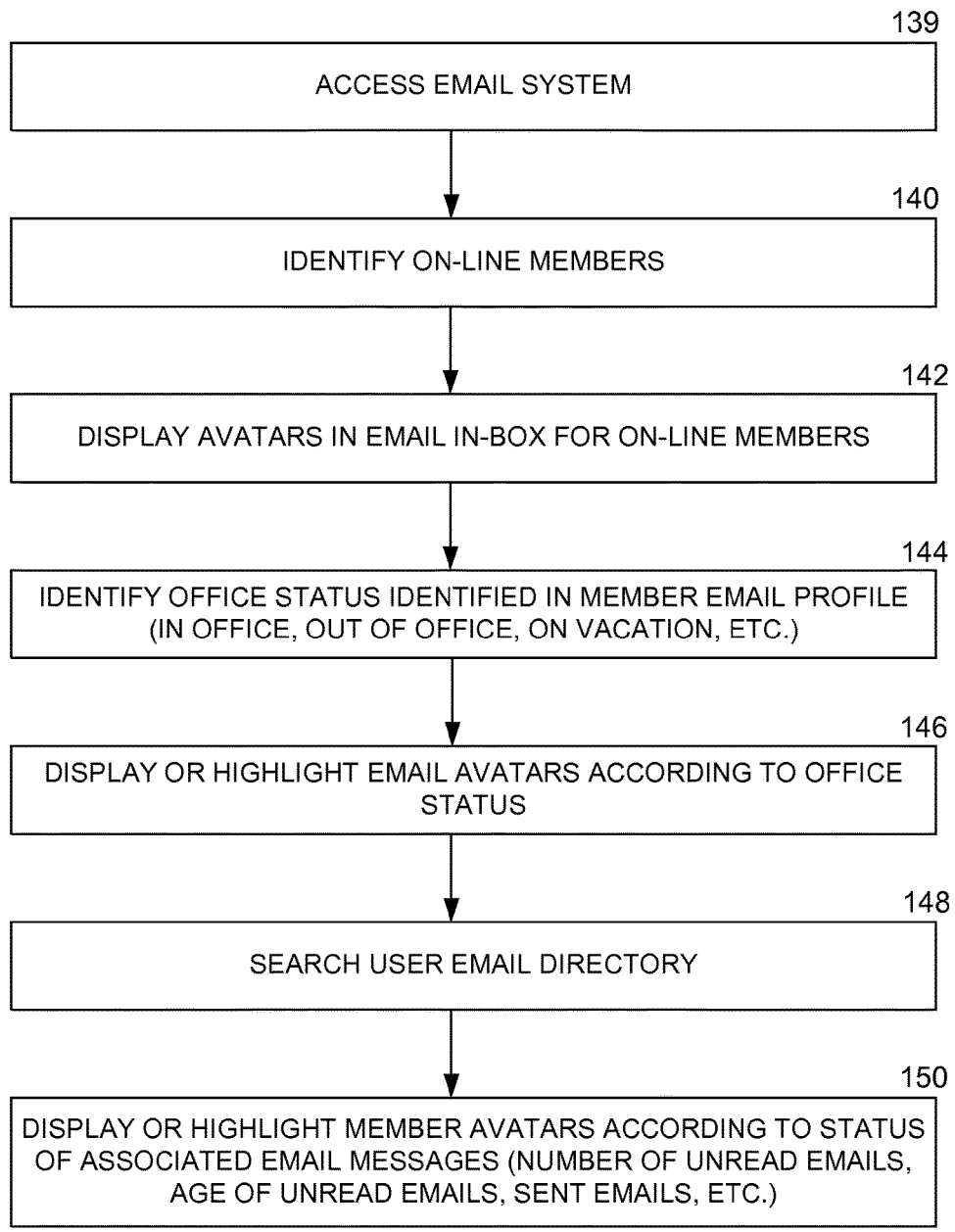

FIG. 11A describes in more detail some of the ways avatars 118A-118F may be displayed in sender bar 116. The email system is accessed and the default inbox page 112 displayed in operation 139. For example, the user may log into the website operating the email system by entering a user name and password. A website may then either automatically display the default inbox page 112 in FIG. 10, or may display the inbox page 112 after the user clicks on an associated link in a home page.

Operation 140 accesses the email server and may automatically identify other members who may currently be on-line. On-line members may be persons who have logged onto a same website, or other people who are currently logged onto their computers or logged into an email system in a same LAN.

Operation 142 describes one embodiment where avatars 118 for all the identified on-line members are displayed in sender bar 116. For example, avatars for all of the company employees that are currently logged into their computers may be constantly scrolled across sender bar 116. Of course, this is just one example of which avatars 118 may be displayed in sender bar 116.

In another embodiment, operation 144 identifies the different on-line or off-line status of members. This may include identifying persons identified as "in the office", "temporarily out of the office", or possibly "on vacation" for some period of time. This information can be located via the member profiles and other email configuration information.

Operation 146 displays or highlights the avatars 118 according to their identified office status. For example, avatars 118 may only be displayed for members identified as currently in the office. Alternatively, all members of a particular enterprise, LAN, website, etc. may be displayed and the avatars dimmed or "grayed-out" for members that are currently off-line or identified as being out of the office.

In yet another embodiment, operation 148 searches the user email directory 20 in FIG. 1 for other email message information. For example, the email senders associated with the most recently received emails, unread emails, the largest number of unread emails, the oldest unread emails, etc. may be identified in operation 148. The avatars 118 or messages for the identified email senders may then be displayed or highlighted in operation 150.

The user receiving the email messages may also configure the avatar display system to select between displaying a local picture of the email sender uploaded in the user contacts list 18 or display a picture obtained from the sender's website profile 22 in FIG. 1. If a member profile picture is preferred, the avatar system may determine if any of the avatars that will be displayed are associated with members of the same website. For example, the avatar display system may compare the sender email address in a received email message with email addresses of other website members. Sender email addresses matching a web site member email address are identified. Any associated photo, audio clip, image, graphic, etc., in the identified website member profile is then displayed as one of the avatars 118 in sender bar 116 of FIG. 10.

In another embodiment, the member profile may identify a link to a personal web site location that contains the image or audio clip for displaying in bar 116. Accordingly, the avatar system accesses or selects the link provided in the user profile and displays the information at the link location as one of the avatars 118 in bar 116.

Thus, in one embodiment, the email sender has control over what photo is displayed as an avatar 118 in inbox 112. This may be significant in that the email sender may want to frequently change the images displayed with particular email messages. In another embodiment, the email sender may also configure their website member profile to provide different images for different destination email addresses. The email system identifies the image in the member profile associated with the destination email address and attaches the identified image to the sent email message.

The email sender may not be a member of the website operating the email system in FIG. 10, or the user of in-box 112 may choose to override any photo identified in a web site member profile. In either case, the avatar system may check the user contacts list 18 in FIG. 1 for previously uploaded images. For example, the user may add contact information for a particular person that, in addition to including an email address, business address and various phone numbers, may also include an associated photo or other image. The avatar system checks the user contact list 18 for an email address corresponding with the sender email address in the received email message. If a matching email address is located and the located contact includes a photo, then that photo is displayed as one of the avatars 18 in the recent sender bar 16.

The avatar display system may also be configured to insert advertisements into the sender bar 116 either for particular sender email addresses, domain names, or generically for any email sender with no associated photo. For example, a recently received email may be identified as coming from a particular airline company. The avatar system inserts an advertisement or banner advertisement avatar 118C that was previously provided by the airline. The banner ad avatar 118C may be displayed in the sender bar 116 whenever one of the most recently received emails has a particular airline email address or domain name.

FIG. 11B shows some more examples of how the avatars may be displayed according to different email message conditions. In this example, avatars 28A and 28C are associated with members that are currently in the office. Avatar 28B is grayed out reflecting a member currently not in the office. The balding on avatar 28D represents an email sender associated with an unread email. The highlighting on avatar 28E indicates the associated email sender has sent more than 20 email messages within the last week.

The avatars 28 associated with particular email senders or email conditions may be bolded, flashed, displayed with an associated sound or video clip, or given any other display characteristic. A message or other text may also be displayed next to the avatars 28 as shown in FIG. 11B further explaining the office status or email status for emails sent by the associated member.

Identifying Common Contacts

Figure 12:
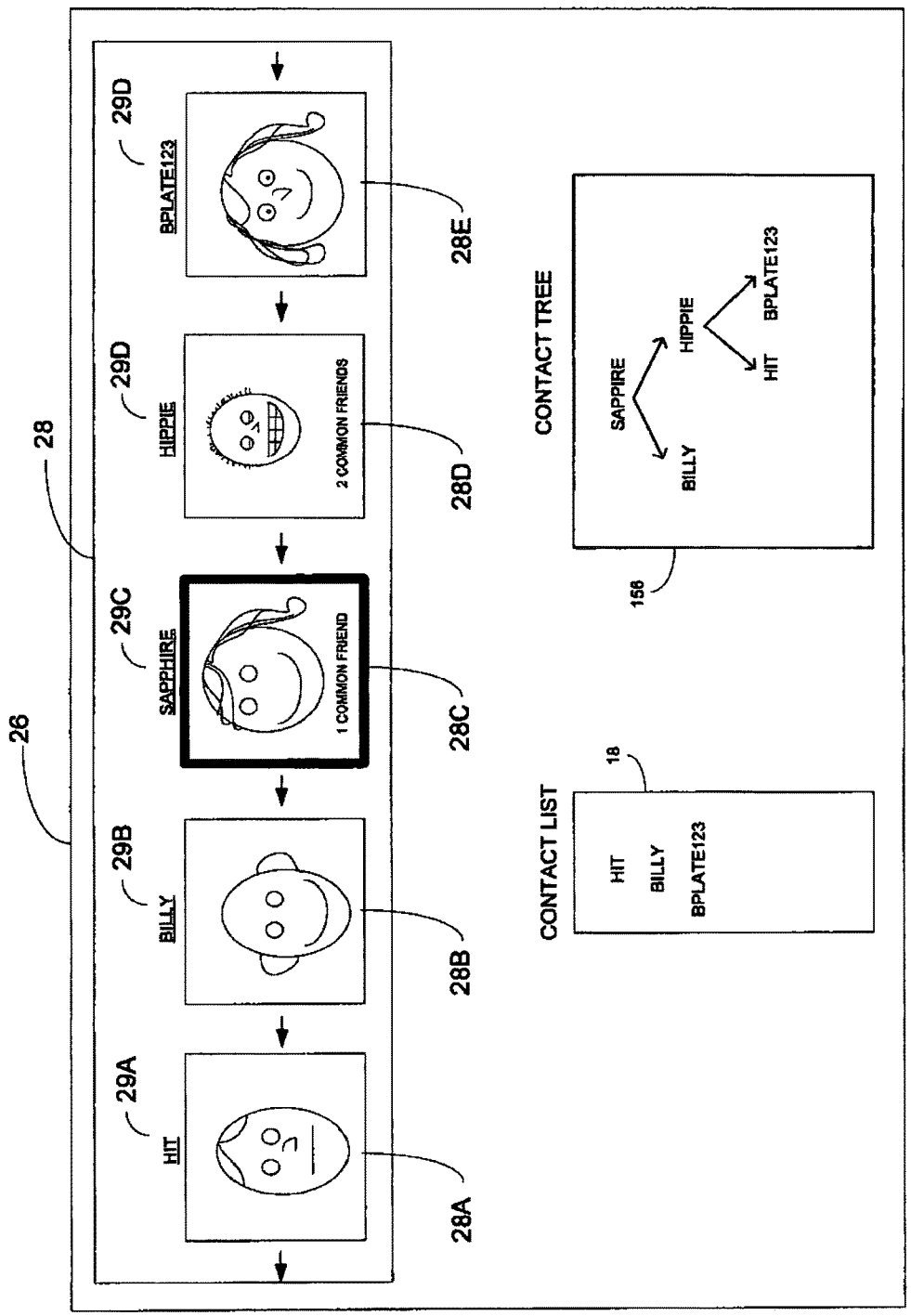
FIG. 12 is a block diagram showing how the avatar display system can be used to identify common contacts for different members.

FIG. 12 shows the same avatars 28 previously shown in FIG. 3. However, in this embodiment, the avatar display system may filter avatars 28 according to common contact information. Alternatively, any common contact information between the user and another member may be displayed along with that members associated avatar 28. Identifying these common contacts can increase or simplify the social interaction between different on-line members.

Figure 13:
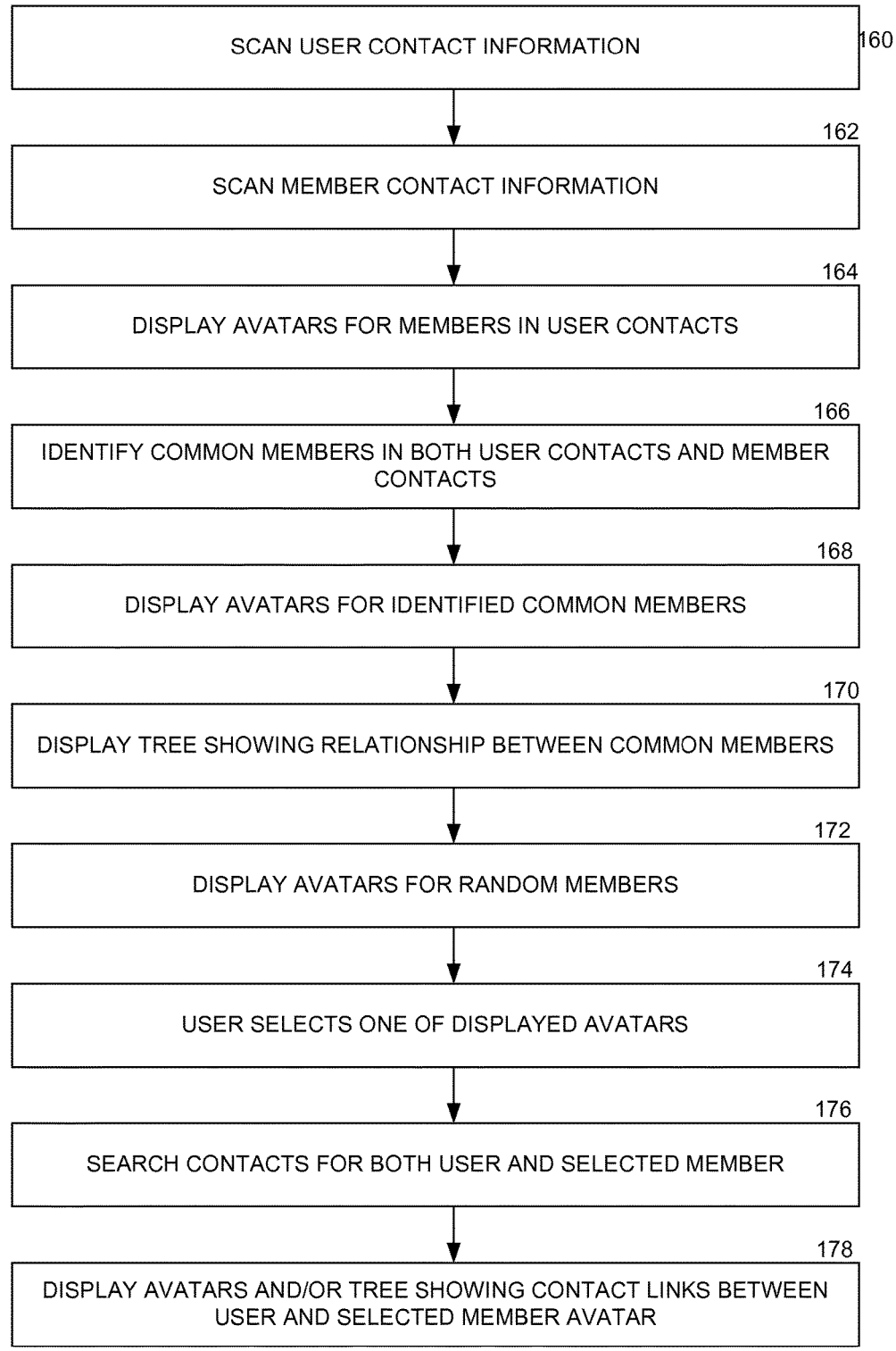
FIG. 13 is a flow diagram explaining FIG. 12 in more detail.

Referring to FIGS. 12 and 13, the user contact information 18 is scanned in operation 160 and other member contact information is scanned in operation 162. The avatars 28 for on-line members identified in the user contact list may be displayed in operation 164.

In another embodiment, any members that may have some direct or indirect association with the user may be identified in operation 166. For example, a particular member SAPPHIRE associated with say avatar 28C, may not be contained within the use contact list 18. However, one or more of the members in user contract list 18 may have a contact for the member SAPPHIRE associated with avatar 28C. This is referred to as a 'once-removed' contact. If the user adds an avatar preference 14C (FIG. 1) to display all once removed contacts, then the avatar 28C for the once removed contact member SAPPHIRE displayed in operation 168. Any level of removed contacts may be selected by the user. For example, the user may configure avatar preferences 14C in FIG. 1 to identify all on-line members that are at least twice or three times removed from the user contacts 18.

Another feature in operation 170 may display a contact tree 156 that shows the relationship between members. For example, the contact tree 156 shows that the member SAPPIRE is once removed from the user through a common member BILLY. The contact tree 156 also shows that the member SAPPIRE is twice removed from the user through members HIT and BPLATE123 in the user contact list 18. This means that neither members HIT or BPLATE123 have member SAPPHIRE in their contact lists. However, another member HIPPIE has the members HIT, BPLATE123, and SAPPHIRE in his contact list. In other words, the user is twice removed from member SAPPHIRE though member HIPPIE and either member HIT or BPLATE123.

In yet another embodiment, operation 172 displays avatars 28 for random members. These members may or may not currently be on-line. User actions either selecting or hovering a cursor over one of the displayed avatars 28 is monitored in operation 174. For example, the user may select avatar 28C in FIG. 12. Operation 176 searches the contacts for both the user and the selected member SAPPHIRE. The avatars 28 of the common members or the contact tree 156 showing the links between the user and the member selected for avatar 28C are displayed in operation 178.

In another embodiment, the number of friends or members in common between the user and the members are also displayed along with avatars 28. For example, avatar 28C indicates the user has one person in their contact list in common with the associated member SAPPHIRE. Avatar 28D indicates the user has two people in their contact list in common with that associated member HIPPIE.

Social Website

Several examples were given above for use of the avatar display system with social websites. One example of a social website incorporated by reference above is entitled: APPARATUS FOR INCREASING SOCIAL INTERACTION OVER AN ELECTRONIC NETWORK. One aspect of this system is shown in FIG. 14.

Figure 14:
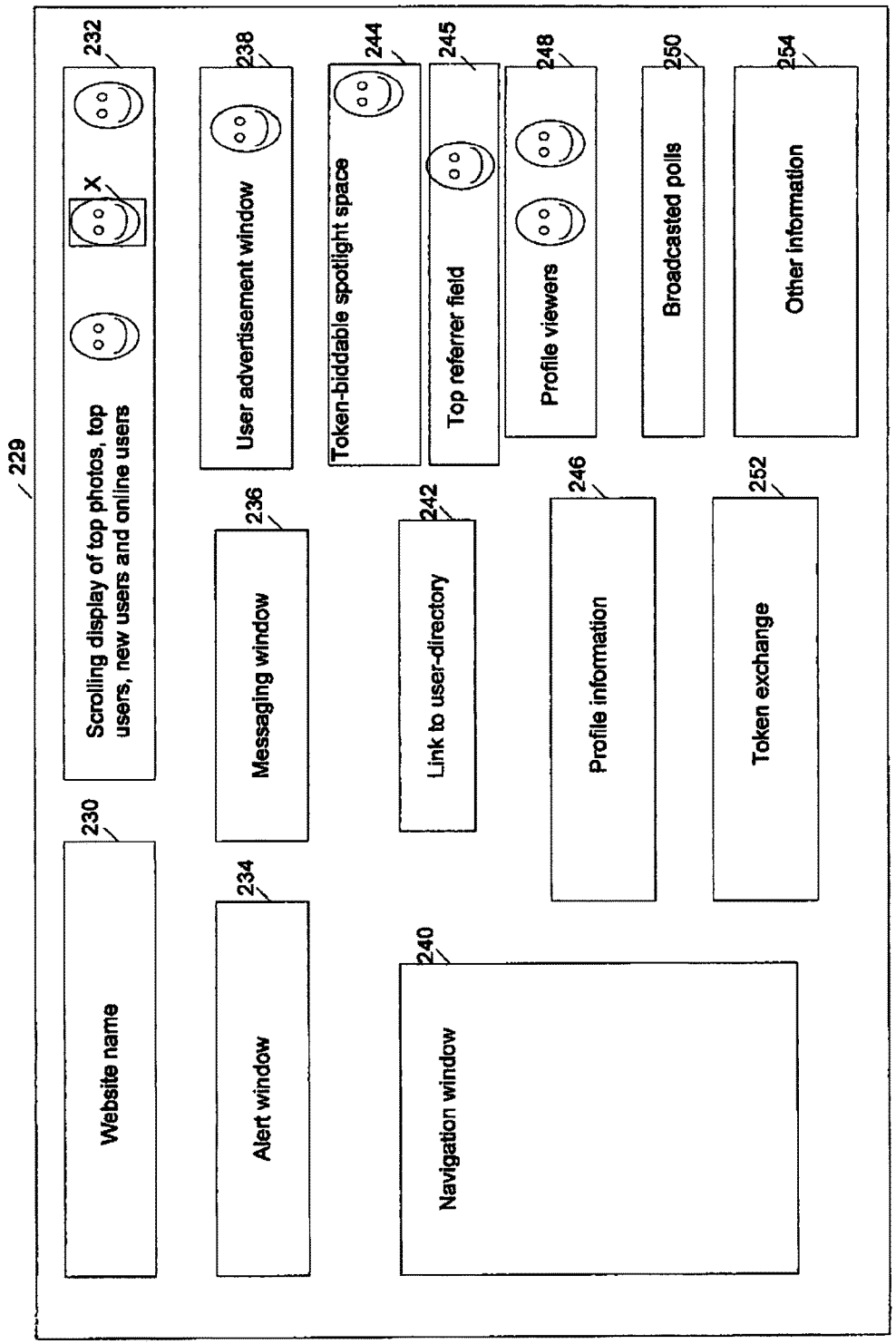
FIG. 14 is a block diagram showing how the avatar display system can be used in conjunction with a social on-line website.

Referring to FIG. 14, a user homepage 229 includes a website name 230. The page 229 also includes a scrolling avatar display 232 that displays the avatars of website members in any of the different ways described above.

The page 229 displays an alert window 234 that provides various indications about website operation as well as award notifications and indications of activity by other users. The page also includes a messaging window 236 that displays links to other members. The page 229 also includes a user advertisement window 238 that displays messages that are sent from one user to all other members. For example, one user may expend tokens or pay money to have his message and photo sent to all website members for display in window 238.

The page 229 also includes a link 242 to a user-directory, which displays photos and names of every site member. The page 229 includes a token-biddable spotlight space 244, which spotlights a user's profile and photo for a predetermined amount of time when a user wins an auction using tokens or money. The page 229 also includes a top referrer field 245 that identifies top referrers identified by a correlator.

The page 229 also includes profile information 246 that allows a user to view and edit his active profile. Other user objects may be uploaded or changed using the navigation window 240.

The page 229 also includes a field 248 showing photos of members that have recently viewed the user's profile included in field 246. Thus, the user is able to identify other members that viewed his profile and that may be interested in communicating with him. A field 250 shows polls that are broadcasted by users having a score sufficient to enable polling functionality.

A portion 252 organizes links to expend tokens or money, such as by purchasing virtual beers, initiating happy hours, purchasing user advertisements in the window 238, etc. Another window 254 provides various other information such as links to flash games, links to online lounges or chat rooms that may be formed and controlled by high scoring users, links to audio or video segments uploaded by other users, etc. All of these features are described in more detail in the co-pending application referred to above. The avatar display system 12 in FIG. 1 can operate with any of the activities and information contained in page 229.

Several preferred examples have been described above with reference to the accompanying drawings. Various other examples of the invention are also possible and practical. The system may be exemplified in many different forms and should not be construed as being limited to the examples set forth above.

The figures listed above illustrate preferred examples of the application and the operation of such examples. In the figures, the size of the boxes is not intended to represent the size of the various physical components. Where the same element appears in multiple figures, the same reference numeral is used to denote the element in all of the figures where it appears.

Only those parts of the various units are shown and described which are necessary to convey an understanding of the examples to those skilled in the art. Those parts and elements not shown are conventional and known in the art.

The system described above can use dedicated processor systems, micro controllers, programmable logic devices, or microprocessors that perform some or all of the operations. Some of the operations described above may be implemented in software and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

Having described and illustrated the principles of the invention in a preferred embodiment thereof, it should be apparent that the invention may be modified in arrangement and detail without departing from such principles. We claim all modifications and variation coming within the spirit and scope of the following claims.

The invention claimed is:

1. A memory device having instructions stored thereon that, in response to execution by a processing device, cause the processing device to perform operations comprising
    identifying avatars for members of a website or on-line application;
    searching contact information for the members and identifying the members having at least some common contact information, wherein the searching and identifying comprises:
        obtaining a contact list corresponding to a member profile of a particular one of the members, the contact list including a first portion of a plurality of member profiles associated with the members, wherein the particular one of the members comprises a first member of the members and the obtained contact list includes information about one or more second members of the members;
        responsive to obtaining the contact list, determining whether to identify for inclusion one of the members that is not of the contact list and that is not the particular member based on activity preference comparisons using activity preferences indicated by the member profiles and a threshold frequency of user interactions or a threshold recentness of at least one of the user interactions, the user interactions with the particular member via the website or the on-line application;
        responsive to obtaining the contact list, determining whether to identify for exclusion one of the members of the contact list that is not the particular member based on at least one of an incoming filter preference indicated by the particular member or an outgoing filter preference indicated by the one of the members of the contact list that is not the particular member; and
    in response to at least one of determining to identify for inclusion the one of the members that is not of the contact list or determining to identify for exclusion the one of the members of the contact list, selecting a second portion of the plurality of member profiles that is different than the first portion of the plurality of member profiles, wherein the second portion is selected based on the activity preference comparisons and the threshold frequency of user interactions with the particular member or the threshold recentness of the at least one of the user interactions, or the incoming or outgoing filter preference; and
    only displaying the avatars for the identified members or varying how the avatars are displayed for the identified members, wherein only displaying the avatars for the identified members or varying how the avatars are displayed for the identified members further comprises:
        only displaying the avatars for the members corresponding to the selected second portion of the plurality of member profiles or varying how the avatars for the members corresponding to the selected second portion of the plurality of member profiles are displayed.

2. The memory device of claim 1, wherein the operations further comprise:
    determining a setting of one of a plurality of filters corresponding to the particular member, wherein the plurality of filters of the particular member comprises a first incoming filter to specify the incoming filter preference and a first outgoing filter; and
    determining whether to identify for inclusion the one of the members that is not of the contact list and that is not the particular member responsive to said filter setting determination.

3. The memory device of claim 2, wherein the operations further comprise:
    determining a setting of one of a plurality of filters corresponding to the member that is not of the contact list and that is not the particular member, wherein the plurality of filters corresponding to the member that is not of the contact list and that is not the particular member comprises a second incoming filter and a second outgoing filter; and
    determining whether to identify for inclusion the one of the members that is not of the contact list and that is not the particular member responsive to said filter setting determinations.

4. The memory device of claim 3, wherein said filter setting determinations correspond to the first incoming filter and the second outgoing filter.

5. The memory device of claim 1, wherein the operations further comprise:
    determining whether to identify for inclusion one of the members that is not the particular member and that is not of the contact list of the particular member, but is of a contact list of one of the members of the contact list of the particular member.

6. The memory device of claim 5, wherein the operations further comprise:
    determining whether to identify for inclusion one of the members that is not the particular member and that is not of the contact list of the particular member and is not of any of contact lists of the members of the contact list of the particular member, but is of a contact list of one of the members of the contact list of one of the members that is of the contact list of the particular member.

7. The memory device of claim 1, wherein the operations further comprise:
    after only displaying the avatars for the members corresponding to the selected second portion of the plurality of member profiles or varying how the avatars for the members corresponding to the selected second portion of the plurality of member profiles are displayed, determining whether the particular member interacts with one of the displayed avatars using an input interface of a computing device corresponding to the particular member;
    responsive to detecting interaction with the one of the displayed avatars using the input interface of the computing device, determining whether to identify one of the members that is not of the displayed avatars but is of a contact list of the member corresponding to the interacted-with displayed avatar; and responsive to determining to identify the one of the members that is not of the displayed avatars but is of the contact list of the member corresponding to the interacted-with displayed avatar, causing the avatar corresponding to said identified one of the members to display on the display of the computing device.

8. The memory device of claim 7, wherein each of the displayed avatars corresponding to the selected second portion forms a distinct soft button or other graphical user interface displayed on the display of the computing device of the particular member, and wherein said determining whether to identify the one of the members that is not of the displayed avatars but is of the contact list of the member corresponding to the interacted-with displayed avatar is performed before complete activation of said distinct soft button or other graphical user interface that corresponds to the interacted-with displayed avatar.

9. The memory device of claim 7, wherein the operations further comprise:
determining whether to notify the member that corresponds to the interacted-with displayed avatar that said avatar was member-interacted with.

10. The memory device of claim 7, wherein the operations further comprise:
determining whether to notify the member that corresponds to the interacted-with displayed avatar that the particular member interacted with said avatar.

11. A method, comprising:
identifying avatars for members of a website or on-line application;
searching contact information for the members and identifying the members having at least some common contact information, wherein the searching and identifying comprises:
obtaining a contact list corresponding to a member profile of a particular one of the members, the contact list including a first portion of a plurality of member profiles associated with the members, wherein the particular one of the members comprises a first member of the members and the obtained contact list includes information about one or more second members of the members;
responsive to obtaining the contact list, determining whether to identify for inclusion one of the members that is not of the contact list and that is not the particular member based on activity preference comparisons using activity preferences indicated by the member profiles and a threshold frequency of user interactions or a threshold recentness of at least one of the user interactions, the user interactions with the particular member via the website or the on-line application;
responsive to obtaining the contact list, determining whether to identify for exclusion one of the members of the contact list that is not the particular member based on at least one of an incoming filter preference indicated by the particular member or an outgoing filter preference indicated by the one of the members of the contact list that is not the particular member; and
in response to at least one of determining to identify for inclusion the one of the members that is not of the contact list or determining to identify for exclusion the one of the members of the contact list, selecting a second portion of the plurality of member profiles that is different than the first portion of the plurality of member profiles, wherein the second portion is selected based on the activity preference comparisons and the threshold frequency of user interactions with the particular member or the threshold recentness of the at least one of the user interactions, or the incoming or outgoing filter preference; and
only displaying the avatars for the members corresponding to the selected second portion of the plurality of member profiles or varying how the avatars for the members corresponding to the selected second portion of the plurality of member profiles are displayed wherein only displaying the avatars for the identified members or varying how the avatars are displayed for the identified members further comprises:
only displaying the avatars for the members corresponding to the selected second portion of the plurality of member profiles or varying how the avatars for the members corresponding to the selected second portion of the plurality of member profiles are displayed.

12. The method of claim 11, further comprising:
determining a setting of one of a plurality of filters corresponding to the particular member, wherein the plurality of filters of the particular member comprises a first incoming filter to specify the incoming filter preference and a first outgoing filter; and
determining whether to identify for inclusion the one of the members that is not of the contact list and that is not the particular member responsive to said filter setting determination.

13. The method of claim 12, further comprising:
determining a setting of one of a plurality of filters corresponding to the member that is not of the contact list and that is not the particular member, wherein the plurality of filters corresponding to the member that is not of the contact list and that is not the particular member comprises a second incoming filter and a second outgoing filter; and
determining whether to identify for inclusion the one of the members that is not of the contact list and that is not the particular member responsive to said filter setting determinations.

14. The method of claim 13, wherein said filter setting determinations correspond to the first incoming filter and the second outgoing filter.

15. The method of claim 11, further comprising:
determining whether to identify for inclusion one of the members that is not the particular member and that is not of the contact list of the particular member, but is of a contact list of one of the members of the contact list of the particular member.

16. The method of claim 15, further comprising:
determining whether to identify for inclusion one of the members that is not the particular member and that is not of the contact list of the particular member and is not of any of contact lists of the members of the contact list of the particular member, but is of a contact list of one of the members of the contact list of one of the members that is of the contact list of the particular member.

17. The method of claim 11, further comprising:
after only displaying the avatars for the members corresponding to the selected second portion of the plurality of member profiles or varying how the avatars for the members corresponding to the selected second portion of the plurality of member profiles are displayed, determining whether the particular member interacts with one of the displayed avatars using an input interface of a computing device corresponding to the particular member;

responsive to detecting interaction with the one of the displayed avatars using the input interface of the computing device, determining whether to identify one of the members that is not of the displayed avatars but is of a contact list of the member corresponding to the interacted-with displayed avatar; and responsive to determining to identify the one of the members that is not of the displayed avatars but is of the contact list of the member corresponding to the interacted-with displayed avatar, causing the avatar corresponding to said identified one of the members to display on the display of the computing device.

18. The method of claim 17, wherein each of the displayed avatars corresponding to the selected second portion forms a distinct soft button or other graphical user interface displayed on the display of the computing device of the particular member, and wherein said determining whether to identify the one of the members that is not of the displayed avatars but is of the contact list of the member corresponding to the interacted-with displayed avatar is performed before any actuation of said distinct soft button or other graphical user interface that corresponds to the interacted-with displayed avatar.

19. The method of claim 17, further comprising:
determining whether to notify the member that corresponds to the interacted-with displayed avatar that said avatar was member-interacted with.

20. The method of claim 17, further comprising:
determining whether to notify the member that corresponds to the interacted-with displayed avatar that the particular member interacted with said avatar.

* * * * *